US012795537B2

(12) United States Patent
Zhang

(10) Patent No.: US 12,795,537 B2
(45) Date of Patent: Nov. 10, 2026

(54) TERMINAL ENERGY SAVING METHOD, APPARATUS, AND SYSTEM

(71) Applicant: HONOR DEVICE CO., LTD., Shenzhen (CN)

(72) Inventor: Jian Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 314 days.

(21) Appl. No.: 18/684,296

(22) PCT Filed: Aug. 24, 2022

(86) PCT No.: PCT/CN2022/114577

§ 371 (c)(1),
(2) Date: Feb. 16, 2024

(87) PCT Pub. No.: WO2023/030138

PCT Pub. Date: Mar. 9, 2023

(65) Prior Publication Data

US 2024/0381251 A1 Nov. 14, 2024

(30) Foreign Application Priority Data

Sep. 1, 2021 (CN) ........................ 202111022590.4

(51) Int. Cl.
*H04W 52/02* (2009.01)
*H04L 67/131* (2022.01)
(Continued)

(52) U.S. Cl.
CPC ....... *H04W 52/0216* (2013.01); *H04W 76/28* (2018.02)

(58) Field of Classification Search
CPC ............. H04W 52/0216; H04W 76/28; H04W 52/0229; H04W 72/04; H04W 52/0235; H04W 76/27; Y02D 30/70; H04L 67/131
See application file for complete search history.

(56) References Cited

U.S. PATENT DOCUMENTS 10,999,800 B2 5/2021 Lin
11,432,237 B2 8/2022 Yu et al.
(Continued)

FOREIGN PATENT DOCUMENTS

CN 103179284 B 11/2015
CN 109246826 A 1/2019
(Continued)

OTHER PUBLICATIONS

Vivo: "Challenges and potential enhancements for XR", 3GPP TSG RAN WG1 #106-e, R1-2106632, e-Meeting, Aug. 16-27, 2021, Aug. 7, 2021 (Aug. 7, 2021), total 8 pages.
(Continued)

*Primary Examiner* — Xuan Lu

(74) *Attorney, Agent, or Firm* — WOMBLE BOND DICKINSON (US) LLP

(57) ABSTRACT

A terminal energy saving method, an apparatus, and a system are provided. The method includes: A terminal device receives first information from a network device, where the first information is used for determining a first CDRX cycle corresponding to the terminal device; and the terminal device determines, according to the first CDRX cycle and a first calculation rule, a moment at which the terminal device enters activation duration, where the first calculation rule is used for controlling the moment at which the terminal device enters the activation duration to match a moment at which the network device sends a downlink frame of a first service according to a service cycle.

20 Claims, 10 Drawing Sheets

(51) Int. Cl.

| | |
|---|---|
| ***H04W 72/04*** | (2023.01) |
| ***H04W 76/27*** | (2018.01) |
| ***H04W 76/28*** | (2018.01) |

(56) References Cited

U.S. PATENT DOCUMENTS

| | | | | |
|---|---|---|---|---|
| 12,193,003 | B2 | 1/2025 | Zhang et al. | |
| 2015/0365995 | A1* | 12/2015 | Tabet | H04W 76/28 370/311 |
| 2020/0383127 | A1 | 12/2020 | Zhu et al. | |
| 2020/0389933 | A1 | 12/2020 | Ang et al. | |
| 2021/0037592 | A1 | 2/2021 | Lee et al. | |
| 2022/0015188 | A1 | 1/2022 | Bao et al. | |
| 2022/0124624 | A1 | 4/2022 | Sha et al. | |
| 2022/0191793 | A1* | 6/2022 | Murray | H04W 52/0232 |
| 2022/0386330 | A1* | 12/2022 | Wu | H04W 72/1263 |
| 2023/0020254 | A1* | 1/2023 | Ly | H04W 76/28 |
| 2023/0051778 | A1* | 2/2023 | Lee | H04W 76/28 |
| 2023/0337016 | A1* | 10/2023 | Takano | H04W 24/02 |

FOREIGN PATENT DOCUMENTS

| | | | |
|---|---|---|---|
| CN | 109952786 | A | 6/2019 |
| CN | 110536383 | A | 12/2019 |
| CN | 110912662 | A | 3/2020 |
| CN | 111107615 | A | 5/2020 |
| CN | 111436165 | A | 7/2020 |
| CN | 113099518 | A | 7/2021 |

OTHER PUBLICATIONS

Qualcomm Incorporated: "Potential Enhancements for XR", 3GPP TSG RAN WG1 #106-e, R1-2107377, e-Meeting, Aug. 16-27, 2021, Aug. 7, 2021 (Aug. 7, 2021), total 12 pages.

Qualcomm Incorporated: "Discussion on on-duration timer", 3GPP TSG-RAN WG2 Meeting NR ad-hoc #1, R2-1801433, Vancouver, Canada, Jan. 22-26, 2018, total 2 pages.

Qualcomm Incorporated: "Power saving enhancements for RedCap Ues", 3GPP TSG-RAN WG2 Meeting #113-e, R2-2100312, Online, Jan. 25-Feb. 5, 2021, total 5 pages.

ZTE, Sanechips: "Discussion on Working Areas of XR for 5G Advanced", 3GPP TSG RAN Rel-18 workshop, RWS-210469, Electronic Meeting, Jun. 28-Jul. 2, 2021, total 16 pages.

Google Inc.: "XR-specific power saving techniques Document for: Discussion and Decision", 3GPP TSG-RAN WG2 Meeting #119 electronic, R2-2207864, Online, Aug. 2022, total 15 pages.

Qualcomm Incorporated, Verizon Wireless, Facebook, "DRX enhancement for XR and CG applications", 3GPP TSG-RAN WG2 Meeting #115-e, R2-2107221, Online, Aug. 16-27, 2021, 4 pages.

Fujitsu, "Alignment of sidelink DRX active time", 3GPP TSG-RAN WG2 Meeting #113bis electronic, R2-2103288, Online, Apr. 12-Apr. 20, 2021, 4 pages.

Fujitsu, "Alignment of Wake-up Time between TX and RX UEs", 3GPP TSG RAN WG2 Meeting #113-e, R2-2100422 (Update of R2-2009133), e-Meeting, Jan. 25-Feb. 5, 2021, 6 pages.

* cited by examiner

TERMINAL ENERGY SAVING METHOD, APPARATUS, AND SYSTEM

CROSS-REFERENCE TO RELATED APPLICATIONS

This application is a national stage of International Application No. PCT/CN2022/114577, filed on Aug. 24, 2022, which claims priority to Chinese Patent application Ser. No. 202111022590.4, filed on Sep. 1, 2021. The disclosures of both of the aforementioned applications are hereby incorporated by reference in their entireties.

This application claims priority to Chinese Patent Application No. 202111022590.4, filed with the China National Intellectual Property Administration on Sep. 1, 2021 and entitled "TERMINAL ENERGY SAVING METHOD, APPARATUS, AND SYSTEM", which is incorporated herein by reference in its entirety.

TECHNICAL FIELD

This application relates to the field of communication technologies, and in particular, to a terminal energy saving method, an apparatus, and a system.

BACKGROUND

With development of communication technologies, extended reality (extended reality, XR) (for example, virtual reality (virtual reality, VR)) services have also emerged. To improve user experience, a terminal device running an XR service is required to be lightweight (for example, VR glasses), and a communication system running an XR service is required to have high throughput and low delay. To achieve such requirements, the terminal device requires high power consumption to run an XR service. Therefore, for normal operation of the terminal device, the power consumption of the terminal device is to be reduced as much as possible.

Currently, a connected discontinuous reception (connected discontinuous reception, CDRX) mechanism is an effective energy-saving technology. Terminal devices equipped with the CDRX mechanism are divided into "wake state" and "sleep state". A terminal device in the "wake state" can monitor a physical downlink control channel (physical downlink control channel, PDCCH) to transmit service data. After the terminal device remains in the "wake state" for a specific period of time, the terminal device enters the "sleep state". The terminal device in the "sleep state" does not monitor the PDCCH, so that the terminal device can achieve the purpose of reducing power consumption. The terminal device in the "wake state" can also be referred to as the terminal device in "activation duration", and the terminal device in the "sleep state" can also be referred to as the terminal device in "deactivation duration". Currently, the duration in which the terminal device remains in the "wake state" and the duration in which the terminal device remains in the "sleep state" constitute a CDRX cycle. In other words, an interval between a time point at which the terminal device enters the "wake state" last time and a time point at which the terminal device enters the "wake state" next time is a CDRX cycle. In the currently defined CDRX mechanism, CDRX cycles are all integers.

To reduce power consumption of a terminal device, the CDRX mechanism can be configured for a terminal device running an XR service. However, downlink frames in current XR services have periodic characteristics, and service cycles are all decimals. For example, when a service frame rate is 120 fps, a service cycle of one frame is 8.33 milliseconds (ms). When the service frame rate is 60 fps, the service cycle of one frame is 16.67 ms. However, CDRX cycles are all integers (for example, 6 ms, 7 ms, 8 ms, or 10 ms). Therefore, when the CDRX mechanism is configured for a terminal device running an XR service, even if a CDRX cycle closest to a service cycle of the XR service is configured for the terminal device, for example, the CDRX cycle is configured as 8 ms when the service cycle of the XR service is 8.33 ms, the CDRX cycle of the terminal device cannot match the service cycle of the XR service. In other words, the terminal device enters the "wake state", and time when data can be transmitted does not match time of XR service data to be transmitted. If the CDRX cycle of the terminal device does not match the service cycle of the XR service, the following situation occurs: When the terminal device is in the "wake state", there is no to-be-transmitted service frame of the XR service, resulting in waste of power consumption of the terminal device. In addition, when there is a to-be-transmitted service frame of the XR service, the terminal device is in the "sleep state" and cannot receive the service frame. Consequently, delay of the XR service does not satisfy delay requirements of the XR service.

In summary, according to the existing technical solutions, the CDRX cycle of the terminal device does not match the service cycle of the XR service, leading to problems such as waste of power consumption of the terminal device or failure to satisfy the delay requirements of the XR service. Therefore, how to make the CDRX cycle of the terminal device match the service cycle of the XR service is an issue that needs to be solved urgently.

SUMMARY

Embodiments of this application provide a terminal energy saving method, an apparatus, and a system, to solve a problem in existing technical solutions that a CDRX cycle of a terminal device does not match a service cycle of an XR service.

To achieve the foregoing objective, the following technical solutions are used in embodiments of this application.

According to a first aspect, a terminal energy saving method is provided. The method includes: A terminal device receives first information from a network device, where the first information is used for determining a first CDRX cycle corresponding to the terminal device; and the terminal device determines, according to the first CDRX cycle and a first calculation rule, a moment at which the terminal device enters activation duration, where the first calculation rule is used for controlling the moment at which the terminal device enters the activation duration to match a moment at which the network device sends a downlink frame of a first service according to a service cycle. Based on this solution, the terminal device can determine the first CDRX cycle according to the first information, and the moment that is determined by the terminal device according to the first CDRX cycle and the first calculation rule and at which the terminal device enters the activation duration matches the moment at which the network device sends the downlink frame of the first service according to the service cycle, thereby avoiding waste of power consumption of the terminal device and satisfying delay requirements of the first service.

With reference to the first aspect, in a possible implementation, the first CDRX cycle corresponding to the terminal device is a first CDRX cycle configured by the network device for the terminal device, and the first CDRX cycle is the same as the service cycle. Based on this solution, the terminal device can configure the first CDRX cycle that is the same as the service cycle of the first service according to the first information, to match the service cycle of the first service.

With reference to the first aspect, in a possible implementation, the first calculation rule satisfies the following relationship: $\lfloor[(SFN\times10)+\text{subframe number}]\ \text{modulo}\ (\text{drx-cycle})\rfloor=\text{drx-StartOffset}$; or $\lfloor[(SFN\times10)+\text{subframe number}]\ \text{modulo}\ (\text{drx-cycle})\rfloor=(\text{drx-StartOffset})\ \text{modulo}\ (\text{drx-cycle})$, where SFN represents a system frame number when the terminal device enters the activation duration; subframe number represents a subframe number in a system frame corresponding to the system frame number; drx-cycle represents the first CDRX cycle; and drx-StartOffset represents a subframe offset before the terminal device enters the activation duration. Based on this solution, a calculation rule is provided that is compatible with integer-valued CDRX cycles and decimal-valued CDRX cycles for determining the moment at which the terminal device enters the activation duration.

With reference to the first aspect, in a possible implementation, the first information includes the service cycle of the first service; or the first information includes a value of the first CDRX cycle; or the first information includes a frequency of the first CDRX cycle; or the first information includes a preset integer value, and the preset integer value is used by the terminal device to determine the first CDRX cycle according to a preset relationship. Based on this solution, a plurality of forms of first information for determining the first CDRX cycle are provided to apply to a plurality of possible situations.

With reference to the first aspect, in a possible implementation, the first information is carried in a radio resource control RRC message. Based on this solution, the first CDRX cycle can be semi-statically configured in the terminal device through the first information in the RRC message.

With reference to the first aspect, in a possible implementation, the first CDRX cycle corresponding to the terminal device is a first CDRX cycle obtained by adjusting, according to the first information, a CDRX cycle configured for the terminal device. Based on this solution, the terminal device can adjust the configured CDRX cycle according to the first information to obtain the first CDRX cycle.

With reference to the first aspect, in a possible implementation, the first calculation rule satisfies the following relationship: $[(SFN\times10)+\text{subframe number}]\ \text{modulo}\ (\text{drx-Cycle}+\text{cycle-adjust})=\text{drx-StartOffset}$; or $[(SFN\times10)+\text{subframe number}]\ \text{modulo}\ (\text{drx-cycle}+\text{cycle-adjust})=(\text{drx-StartOffset})\ \text{modulo}\ (\text{drx-cycle}+\text{cycle-adjust})$, where SFN represents a frame number when the terminal device enters the activation duration; subframe number represents a subframe number in a system frame corresponding to the system frame number; drx-cycle represents a CDRX cycle configured by the network device for the terminal device; cycle-adjust represents a cycle offset value determined by the terminal device according to the first information; (drx-cycle+cycle-adjust) represents the first CDRX cycle corresponding to the terminal device; and drx-StartOffset represents a subframe offset before the terminal device enters the activation duration. Based on this solution, a calculation rule is provided for determining the moment at which the terminal device enters the activation duration in the case of non-memory adjustment of the CDRX cycle.

With reference to the first aspect, in a possible implementation, the first calculation rule satisfies the following relationship: $[(SFN\times10)+\text{subframe number}]\ \text{modulo}\ (\text{drx-cycleN})=\text{drx-StartOffset}$; or $[(SFN>10)+\text{subframe number}]\ \text{modulo}\ (\text{drx-cycleN})=(\text{drx-StartOffset})\ \text{modulo}\ (\text{drx-cycleN})$, where SFN represents a frame number when the terminal device enters the activation duration; subframe number represents a subframe number in a system frame corresponding to the system frame number; drx-cycleN represents the first CDRX cycle corresponding to the terminal device; and drx-StartOffset represents a subframe offset before the terminal device enters the activation duration, where drx-cycleN satisfies the following relationship: $\text{drx-cycleN}=\text{drx-cycle}\ (N-1)+\text{cycle-adjust}$, where drx-cycle (N−1) represents a CDRX cycle configured before the terminal device enters the activation duration; when drx-cycle (N−1)=drx-cycle0, drx-cycle0 represents a CDRX cycle configured by the network device for the terminal device; and cycle-adjust represents a cycle offset value determined by the terminal device according to the first information. Based on this solution, a calculation rule is provided for determining the moment at which the terminal device enters the activation duration in the case of memory adjustment of the CDRX cycle.

With reference to the first aspect, in a possible implementation, the first information is carried in a media access control control element MAC CE message Based on this solution, the CDRX cycle of the terminal device can be dynamically adjusted through the first information in the MAC CE message.

According to a second aspect, a terminal energy saving method is provided. The method includes: A terminal device receives second information from a network device, where the second information is used for determining one or more CDRX cycles in a plurality of CDRX cycles configured by the network device for the terminal device, and the one or more CDRX cycles are used for controlling a moment at which the terminal device enters activation duration to match a moment at which the network device sends a downlink frame of a first service according to a service cycle; and the terminal device determines, according to the one or more CDRX cycles, the moment at which the terminal device enters the activation duration. Based on this solution, the terminal device can determine the one or more CDRX cycles according to the second information, and the moment that is determined by the terminal device according to the one or more CDRX cycles and at which the terminal device enters the activation duration matches the moment at which the network device sends the downlink frame of the first service according to the service cycle, thereby avoiding waste of power consumption of the terminal device and satisfying delay requirements of the first service.

With reference to the second aspect, in a possible implementation, the one or more CDRX cycles are a plurality of cyclic CDRX cycles; and the plurality of cyclic CDRX cycles are used for controlling the moment that corresponds to each CDRX cycle in the plurality of cyclic CDRX cycles and at which the terminal device enters the activation duration to match the moment at which the network device sends the downlink frame of the first service according to the service cycle. Based on this solution, the terminal device can determine the plurality of cyclic CDRX cycles according to the second information, and the moment that corresponds to each CDRX cycle in the plurality of cyclic CDRX cycles and at which the terminal device enters the activation duration matches the moment at which the network device sends the downlink frame of the first service according to the service cycle.

With reference to the second aspect, in a possible implementation, the second information includes identification information corresponding to each CDRX cycle in the plurality of cyclic CDRX cycles, and a sequence of the identification information, where the sequence of the identification information corresponds to a cyclic sequence of the plurality of cyclic CDRX cycles. Based on this solution, second information for determining the plurality of cyclic CDRX cycles according to identification information is provided.

With reference to the second aspect, in a possible implementation, the second information is carried in a radio resource control RRC message; or the second information is carried in a media access control control element MAC CE message. Based on this solution, the plurality of cyclic CDRX cycles can be semi-statically configured in the terminal device through the second information in the RRC message. Alternatively, the plurality of cyclic CDRX cycles can be dynamically updated through the second information in the MAC CE message.

With reference to the second aspect, in a possible implementation, the one or more CDRX cycles are first CDRX cycles; and the first CDRX cycles are used for controlling the moment at which the terminal device enters the activation duration to match the moment at which the network device sends the downlink frame of the first service according to the service cycle. Based on this solution, the terminal device can determine, according to the second information, the first CDRX cycles for controlling the moment at which the terminal device enters the activation duration to match the moment at which the network device sends the downlink frame of the first service according to the service cycle.

With reference to the second aspect, in another possible implementation, the second information includes identification information corresponding to the first CDRX cycle. Based on this solution, second information for determining the first CDRX cycles according to identification information is provided.

With reference to the second aspect, in a possible implementation, the second information is carried in an RRC message; or the second information is carried in a MAC CE message. Based on this solution, the first CDRX cycle can be semi-statically configured in the terminal device through the second information in the RRC message. Alternatively, the first CDRX cycles can be dynamically updated through the second information in the MAC CE message.

With reference to the second aspect, in a possible implementation, the terminal energy saving method further includes: The terminal device receives third information from the network device, where the third information is used by the network device to configure the plurality of CDRX cycles for the terminal device, and the plurality of CDRX cycles include the one or more CDRX cycles. Based on this solution, the plurality of CDRX cycles can be configured for the terminal device through the third information.

With reference to the second aspect, in a possible implementation, the third information includes identification information corresponding to each CDRX cycle in the plurality of CDRX cycles, and configuration information of the CDRX cycle corresponding to the identification information. Based on this solution, each CDRX cycle in the plurality of CDRX cycles configured for the terminal device has corresponding identification information, and the corresponding CDRX cycle can be determined from the plurality of configured CDRX cycles according to the identification information.

With reference to the second aspect, in a possible implementation, the third information is carried in an RRC message. Based on this solution, the plurality of CDRX cycles can be semi-statically configured in the terminal device through the third information in the RRC message.

According to a third aspect, a terminal energy saving method is provided. The method includes: A terminal device receives fourth information from the network device, where the fourth information indicates a moment at which the terminal device enters activation duration next time after receiving a first downlink frame of a first service; the moment at which the terminal device enters the activation duration next time matches a moment at which the network device sends a second downlink frame of the first service; and the second downlink frame is a first downlink frame sent by the network device according to a service cycle after the first downlink frame; and the terminal device determines, according to the fourth information, the moment at which the terminal device enters the activation duration next time after receiving the first downlink frame. Based on this solution, the network device can control, according to the fourth information, the moment at which the terminal device enters the activation duration each time to match the moment at which the first downlink frame of the first service is sent.

With reference to the third aspect, in a possible implementation, the fourth information is carried in a last data packet included in the first downlink frame.

With reference to the third aspect, in a possible implementation, the fourth information further indicates that the terminal device enters deactivation duration after receiving the first downlink frame.

With reference to the third aspect, in a possible implementation, the fourth information is carried in a media access control control element MAC CE message. Based on this solution, the fourth information in the MAC CE message can be used to dynamically indicate the moment at which the terminal device enters the activation duration.

According to a fourth aspect, a communication apparatus is provided. The communication apparatus has a function of implementing the method according to the first aspect. This function may be implemented by using hardware, or may be implemented by executing corresponding software by hardware. The hardware or the software includes one or more modules corresponding to the foregoing function. For example, the communication apparatus may include a transceiver module and a processing module. The transceiver module is configured to receive first information from a network device, where the first information is used for determining a first CDRX cycle corresponding to the communication apparatus. The processing module is configured to determine, according to the first CDRX cycle and a first calculation rule, a moment at which the communication apparatus enters activation duration, where the first calculation rule is used for controlling the moment at which the communication apparatus enters the activation duration to match a moment at which the network device sends a downlink frame of a first service according to a service cycle.

With reference to the fourth aspect, in a possible implementation, the first CDRX cycle corresponding to the communication apparatus is a first CDRX cycle configured by the network device for the communication apparatus, and the first CDRX cycle is the same as the service cycle.

With reference to the fourth aspect, in a possible implementation, the first calculation rule satisfies the following relationship: $\lfloor$[(SFN×10)+subframe number] modulo (drx-cycle)⌋=drx-StartOffset; or ⌊[(SFN×10)+subframe number] modulo (drx-cycle)⌋=(drx-StartOffset) modulo (drx-cycle), where SFN represents a system frame number when the communication apparatus enters the activation duration; subframe number represents a subframe number in a system frame corresponding to the system frame number; drx-cycle represents the first CDRX cycle; and drx-StartOffset represents a subframe offset before the communication apparatus enters the activation duration.

With reference to the fourth aspect, in a possible implementation, the first information includes the service cycle of the first service; or the first information includes a value of the first CDRX cycle; or the first information includes a frequency of the first CDRX cycle; or the first information includes a preset integer value, and the preset integer value is used by the terminal device to determine the first CDRX cycle according to a preset relationship.

With reference to the fourth aspect, in a possible implementation, the first information is carried in a radio resource control RRC message.

With reference to the fourth aspect, in a possible implementation, the first CDRX cycle corresponding to the communication apparatus is a first CDRX cycle obtained by adjusting, according to the first information, a CDRX cycle configured for the communication apparatus.

With reference to the fourth aspect, in a possible implementation, the first calculation rule satisfies the following relationship: [(SFN×10)+subframe number] modulo (drx-Cycle+cycle-adjust)=drx-StartOffset; or [(SFN×10)+subframe number] modulo (drx-cycle+cycle-adjust)=(drx-StartOffset) modulo (drx-cycle+cycle-adjust), where SFN represents a frame number when the communication apparatus enters the activation duration; subframe number represents a subframe number in a system frame corresponding to the system frame number; drx-cycle represents a CDRX cycle configured by the network device for the communication apparatus; cycle-adjust represents a cycle offset value determined by the communication apparatus according to the first information; (drx-cycle+cycle-adjust) represents the first CDRX cycle corresponding to the communication apparatus; and drx-StartOffset represents a subframe offset before the communication apparatus enters the activation duration.

With reference to the fourth aspect, in a possible implementation, the first calculation rule satisfies the following relationship: [(SFN×10)+subframe number] modulo (drx-cycleN)=drx-StartOffset; or [(SFN×10)+subframe number] modulo (drx-cycleN)=(drx-StartOffset) modulo (drx-cycleN), where SFN represents a frame number when the communication apparatus enters the activation duration; subframe number represents a subframe number in a system frame corresponding to the system frame number; drx-cycleN represents the first CDRX cycle corresponding to the communication apparatus; and drx-StartOffset represents a subframe offset before the communication apparatus enters the activation duration, where drx-cycleN satisfies the following relationship: drx-cycleN=drx-cycle (N−1)+cycle-adjust, where drx-cycle (N−1) represents a CDRX cycle configured before the communication apparatus enters the activation duration; when drx-cycle (N−1)=drx-cycle0, drx-cycle0 represents a CDRX cycle configured by the network device for the communication apparatus; and cycle-adjust represents a cycle offset value determined by the communication apparatus according to the first information.

With reference to the fourth aspect, in a possible implementation, the first information is carried in a media access control control element MAC CE message For technical effects of the fourth aspect, refer to the technical effects of the first aspect. Details are not described herein again.

According to a fifth aspect, a communication apparatus is provided. The communication apparatus has a function of implementing the method according to the second aspect. This function may be implemented by using hardware, or may be implemented by executing corresponding software by hardware. The hardware or the software includes one or more modules corresponding to the foregoing function. For example, the communication apparatus may include a transceiver module and a processing module. The transceiver module is configured to receive second information from a network device, where the second information is used for determining one or more CDRX cycles in a plurality of CDRX cycles configured by the network device for the communication apparatus, and the one or more CDRX cycles are used for controlling a moment at which the communication apparatus enters activation duration to match a moment at which the network device sends a downlink frame of a first service according to a service cycle. The processing module is configured to determine, according to the one or more CDRX cycles, the moment at which the communication apparatus enters the activation duration.

With reference to the fifth aspect, in a possible implementation, the one or more CDRX cycles are a plurality of cyclic CDRX cycles; and the plurality of cyclic CDRX cycles are used for controlling the moment at which the communication apparatus corresponding to each CDRX cycle in the plurality of cyclic CDRX cycles enters the activation duration to match the moment at which the network device sends the downlink frame of the first service according to the service cycle.

With reference to the fifth aspect, in a possible implementation, the second information includes identification information corresponding to each CDRX cycle in the plurality of cyclic CDRX cycles, and a sequence of the identification information, where the sequence of the identification information corresponds to a cyclic sequence of the plurality of cyclic CDRX cycles.

With reference to the fifth aspect, in a possible implementation, the second information is carried in a radio resource control RRC message; or the second information is carried in a media access control control element MAC CE message.

With reference to the fifth aspect, in a possible implementation, the one or more CDRX cycles are first CDRX cycles; and the first CDRX cycles are used for controlling the moment at which the communication apparatus enters the activation duration to match the moment at which the network device sends the downlink frame of the first service according to the service cycle.

With reference to the fifth aspect, in another possible implementation, the second information includes identification information corresponding to the first CDRX cycle.

With reference to the fifth aspect, in a possible implementation, the second information is carried in an RRC message; or the second information is carried in a MAC CE message.

With reference to the fifth aspect, in a possible implementation, the transceiver module is further configured to receive third information from the network device, where the third information is used by the network device to configure the plurality of CDRX cycles for the communication apparatus, and the plurality of CDRX cycles include the one or more CDRX cycles.

With reference to the fifth aspect, in a possible implementation, the third information includes identification information corresponding to each CDRX cycle in the plurality of CDRX cycles, and configuration information of the CDRX cycle corresponding to the identification information.

With reference to the fifth aspect, in a possible implementation, the third information is carried in an RRC message.

For technical effects of the fifth aspect, refer to the technical effects of the second aspect. Details are not described herein again.

According to a sixth aspect, a communication apparatus is provided. The communication apparatus has a function of implementing the method according to the third aspect. This function may be implemented by using hardware, or may be implemented by executing corresponding software by hardware. The hardware or the software includes one or more modules corresponding to the foregoing function. For example, the communication apparatus may include a transceiver module and a processing module. The transceiver module is configured to receive fourth information from the network device, where the fourth information indicates a moment at which the communication apparatus enters activation duration next time after receiving a first downlink frame of a first service; the moment at which the communication apparatus enters the activation duration next time matches a moment at which the network device sends a second downlink frame of the first service; and the second downlink frame is a first downlink frame sent by the network device according to a service cycle after the first downlink frame. The processing module is configured to determine, according to the fourth information, the moment at which the communication apparatus enters the activation duration next time after receiving the first downlink frame.

With reference to the sixth aspect, in a possible implementation, the fourth information is carried in a last data packet included in the first downlink frame.

With reference to the sixth aspect, in a possible implementation, the fourth information further indicates that the communication apparatus enters deactivation duration after receiving the first downlink frame.

With reference to the sixth aspect, in a possible implementation, the fourth information is carried in a media access control control element MAC CE message.

For technical effects of the sixth aspect, refer to the technical effects of the third aspect. Details are not described herein again.

According to a seventh aspect, a communication apparatus is provided, and includes: a processor and a memory. The memory is configured to store computer executable instructions. When the communication apparatus runs, the processor executes the computer executable instructions stored in the memory, so that the communication apparatus performs the terminal energy saving method according to any one of the first aspect, the second aspect, or the third aspect.

According to an eighth aspect, a communication apparatus is provided, and includes a processor. The processor is configured to perform, after being coupled to a memory and reading instructions in the memory, the terminal energy saving method according to any one of the first aspect, the second aspect, or the third aspect according to the instructions.

According to a ninth aspect, a communication apparatus is provided, including: a processor, a memory, and a transceiver, where the memory is configured to store computer executable instructions; the processor is configured to execute the instructions stored in the memory; the transceiver is configured for communicate between the communication apparatus and another device in a communication network; and when the communication apparatus runs, the processor executes the computer executable instructions stored in the memory, and the transceiver communicates with another device in the communication network, so that the communication apparatus performs the terminal energy saving method according to any one of the first aspect, the second aspect, or the third aspect.

According to a tenth aspect, a computer-readable storage medium is provided. The computer-readable storage medium stores instructions. When the instructions are run on a computer, the computer is enabled to perform the terminal energy saving method according to any one of the first aspect, the second aspect, or the third aspect.

According to an eleventh aspect, a computer program product including instructions is provided. When the instructions are run on a computer, the computer is enabled to perform the terminal energy saving method according to any one of the first aspect, the second aspect, or the third aspect.

According to a twelfth aspect, a communication apparatus is provided. The communication apparatus includes a processor configured to support the communication apparatus to implement the functions related to any one of the first aspect, the second aspect, or the third aspect. In a possible design, the communication apparatus further includes a memory. The memory is configured to store program instructions and data that are required for the communication apparatus. The apparatus may include a chip, or may include a chip and another discrete device.

According to a thirteenth aspect, a communication system is provided, including: a terminal device that performs the method described in the first aspect and a network device that performs the method described in the first aspect; or a terminal device that performs the method described in the second aspect, and a network device that performs the method described in the second aspect; or a terminal device that performs the method described in the third aspect and a network device that performs the method described in the third aspect.

For technical effects brought by any implementation in the seventh to thirteenth aspects, refer to the technical effects brought by different implementations in the first aspect, the second aspect, or the third aspect. Details are not described herein again.

DESCRIPTION OF EMBODIMENTS

Before embodiments of this application are described in detail, for ease of understanding the technical solutions of embodiments of this application, a brief introduction is first given to the relevant technologies of this application below:

1. CDRX Mechanism

The CDRX mechanism is an effective energy-saving technology. When CDRX is configured for a terminal device, the terminal device can enter a sleep period at specific times. In this case, the terminal device is in a "sleep state", or "deactivation duration", and the terminal device does not need to monitor a PDCCH. When it is necessary to monitor the PDCCH to receive downlink service data, the terminal device is awakened from the "sleep state" and enters an "activated state", that is, enters activation duration. In this way, the terminal device can achieve the purpose of saving power.

Figure 1:
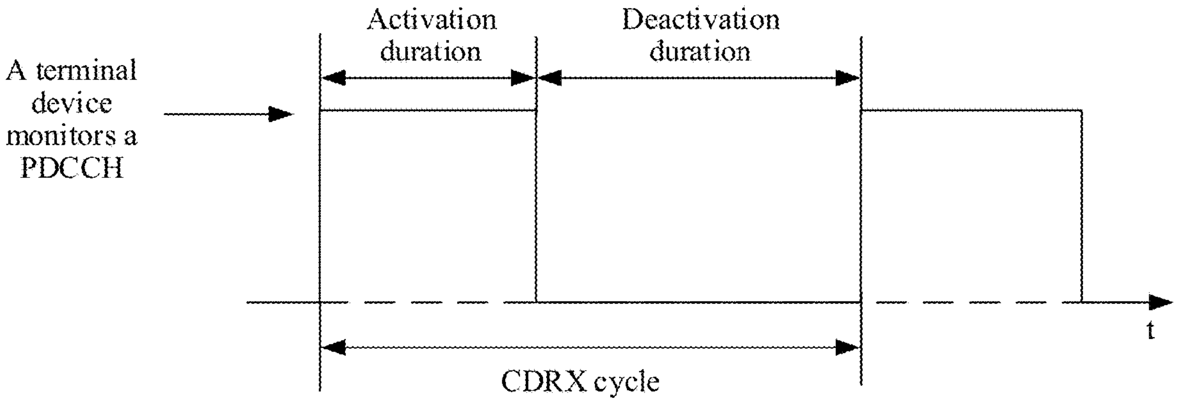
FIG. 1 is a schematic diagram of a CDRX cycle according to an embodiment of this application.

A typical CDRX cycle is shown in FIG. 1:

Activation duration: After the terminal device is awakened, the terminal device enters fixed-length activation duration. This fixed-length activation duration may be referred to as on-duration. If the terminal device receives a scheduled PDCCH in the on-duration, the terminal device remains in the awakened state and extends the activation duration. The length of the on-duration is configured by a network device for the terminal device.

Deactivation duration: This duration is the sleep time in the CDRX mechanism, that is, the time when the terminal device enters sleep without monitoring the PDCCH in order to save power.

CDRX cycle: It is a repetition cycle of the on-duration, that is, a time interval between a moment at which the terminal device enters the activation duration last time and a moment at which the terminal device enters the activation duration next time. A CDRX cycle includes activation duration and deactivation duration.

Currently, the CDRX cycle is a fixed value semi-statically configured in the terminal device by the network device through a radio resource control (radio resource control, RRC) message. A protocol stipulates that values of the CDRX cycle that can be configured are all integers. In addition, when the network device configures the CDRX cycle for the terminal device, the network device can further indicate whether the configured CDRX cycle is a long cycle or a short cycle. For example, a short DRX field included in the RRC message indicates that the configured CDRX cycle of 10 ms is a short cycle.

Whether the CDRX cycle is a long cycle or a short cycle is related to a moment at which the terminal device enters the activation duration. The following describes how the terminal device determines the moment at which the terminal device enters the activation duration.

In the current CDRX mechanism, the terminal device determines the moment at which the terminal device enters the activation duration through the following formula:

When the CDRX cycle(drx-cycle) is a long cycle (long DRX cycle): [(SFN×10)+subframe number]modulo(drx-cycle)=drx-StartOffset     formula (1); or when the CDRX cycle(drx-cycle) is a short cycle (short DRX cycle): [(SFN×10)+subframe number]modulo(drx-cycle)=(drx-StartOffset)modulo (drx-cycle)     formula (2), where SFN represents a system frame number (system frame number) when the terminal device enters the activation duration; subframe number represents a subframe number in a system frame corresponding to the system frame number when the terminal device enters the activation duration; drx-cycle represents the CDRX cycle of the terminal device; and drx-StartOffset represents a subframe offset before the terminal device enters the activation duration.

In the foregoing parameters, the value of drx-cycle is a fixed integer configured by the network device, and the value of drx-StartOffset is also a fixed value configured by the network device for the terminal device. SFN may be any integer from 0 to 1023. subframe number may be any integer from 0 to 9.

To avoid ambiguity, the operation symbol modulo in formula (1) or formula (2) is explained herein: a modulo b means a remainder obtained by dividing a by b. This is explained herein uniformly and is not repeated below.

The terminal device can determine the values of SFN and subframe number that satisfy the foregoing formula (1) or (2) based on the values of drx-cycle and drx-StartOffset in the foregoing parameters, as well as SFN and subframe number currently corresponding to the terminal device, and then determine, according to the obtained values of SFN and subframe number, a system frame number and a subframe number in the system frame when the terminal device enters the activation duration next time. For example, assuming that drx-cycle=8, and drx-StartOffset=0, the terminal device determines, according to a system message broadcast by the network device, that the SFN currently corresponding to the terminal device is equal to 0, subframe number=0, and the CDRX cycle is a short cycle. The terminal device substitutes the values of drx-cycle and drx-StartOffset into formula (2), and starts to evaluate SFN and subframe number from SFN=0 and subframe number=0, until values of SFN and subframe number that satisfy formula (2) are obtained. The terminal device determines that SFN–0 and subframe number=0 satisfy formula (2). Therefore, a moment at which the terminal device enters the activation duration for the first time is a moment corresponding to a subframe number 0 in a system frame with the frame number 0. After the terminal device enters the activation duration for the first time, values of SFN and subframe number that satisfy formula (2) are determined again starting from the current SFN and subframe number of the terminal device. It is obtained that when SFN=0 and subframe number=8, formula (2) is satisfied. Therefore, after the terminal device enters the activation duration for the first time, a determined moment (a moment at which the terminal device enters the activation duration for the second time) at which the terminal device enters the activation duration next time is a moment corresponding to a subframe number 8 in the system frame with the frame number 0. By analogy, after the terminal device enters the activation duration for the second time, a determined moment (a moment at which the terminal device enters the activation duration for the third time) at which the terminal device enters the activation duration next time is a moment corresponding to a subframe number 6 in a system frame with the frame number 1.

Further, after determining the system frame number when the terminal device enters the activation duration and the subframe number in the system frame, the terminal device may further determine, according to a slot offset (drx-slot offset) configured by the network device for the terminal device, the moment at which the terminal device enters the activation duration in the subframe. For example, starting from a starting position of the subframe in the determined system frame, the terminal device enters the activation duration with an offset of drx-slot offset*1/32 ms.

With development of communication technologies, XR services have also emerged and continue to develop. To improve user experience, a terminal device running an XR service is required to be lightweight (for example, VR glasses), and an XR service is required to have high throughput and low delay. To achieve such requirements, the terminal device requires high power consumption to run an XR service. Therefore, some topics point out that how to reduce power consumption of XR services is a key research direction.

Figure 2:
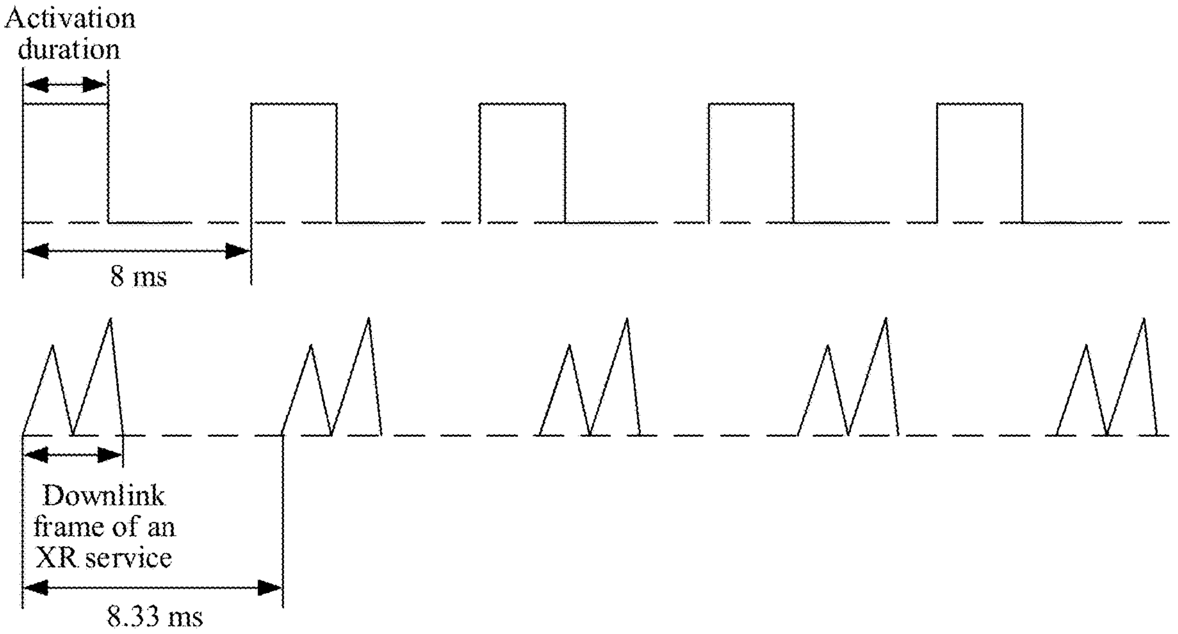
FIG. 2 is a schematic diagram of an XR service cycle and a CDRX cycle according to an embodiment of this application.

To reduce power consumption of a terminal device running an XR service, the CDRX mechanism can be configured for a terminal device running an XR service. However, downlink frames in current XR services have periodic characteristics, and service cycles are all decimals. For example, when a service frame rate is 120 fps, a service cycle of one frame is 8.33 ms. When the service frame rate is 60 fps, the service cycle of one frame is 16.67 ms. Currently, CDRX cycles that can be configured for the terminal device are all integers. Therefore, when the CDRX mechanism is configured for a terminal device running an XR service, even if a CDRX cycle closest to a service cycle of the XR service is configured for the terminal device, for example, a CDRX cycle of 8 ms is configured for the terminal device when the service cycle of the XR service is 8.33 ms, the CDRX cycle of the terminal device cannot match the service cycle of the XR service. In other words, time when data can be transmitted by the terminal device does not match time of XR service data to be transmitted. For example, as shown in FIG. 2, assuming that the service cycle of the XR service is 8.33 ms, the network device sends a downlink frame of the XR service every 8.33 ms. The CDRX cycle configured for the terminal device is 8 ms. As time goes by, the mismatch between the service cycle of the XR service and the CDRX cycle gradually becomes higher, until the transmission time of the downlink frame of the XR service is completely offset from the activation duration of the terminal device. As can be learned from FIG. 2 that, if the CDRX cycle of the terminal device does not match the service cycle of the XR service, the following situations occur: 1. When the terminal device is in the activation duration, there is no to-be-transmitted XR service data (service frame), resulting in waste of power consumption of the terminal device. 2. When there is to-be-transmitted XR service data, the terminal device cannot receive the data when in the deactivation duration. The data can only be received when the terminal device enters the next activation duration. As a result, the delay of the XR service run by the terminal device does not satisfy delay requirements of the XR service. 3. The capacity and quality of the entire communication system decrease.

In summary, according to the existing technical solutions, the CDRX cycle of the terminal device does not match the service cycle of the XR service, leading to problems such as waste of power consumption of the terminal device or failure to satisfy the delay requirements of the XR service. Therefore, how to make the CDRX cycle of the terminal device match the service cycle of the XR service is an issue that needs to be solved urgently.

The following describes the technical solutions in embodiments of this application with reference to the accompanying drawings in embodiments of this application. In the descriptions of this application, unless otherwise specified, "/" indicates an "or" relationship between associated objects. For example, A/B may indicate A or B. In this application, "and/or" describes only an association relationship between associated objects and indicates that three relationships may exist. For example, A and/or B may indicate the following three cases: Only A exists, both A and B exist, and only B exists, where A and B may be singular or plural. In addition, in descriptions of this application, unless otherwise specified, "a plurality of" means two or more than two. At least one of the following items (pieces) or a similar expression thereof refers to any combination of these items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, to clearly describe the technical solutions in embodiments of this application, terms such as first and second are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference. Moreover, in embodiments of this application, terms such as "illustrative" and "for example" are used for presenting an example, an instance, or an illustration. Any embodiment or design scheme described as an "example" or "for example" in embodiments of this application should not be explained as being more preferred or having more advantages than another embodiment or design scheme. To be precise, the terms such as "illustrative" and "for example" are intended to present a related concept in a specific manner to facilitate understanding.

In addition, the network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

The terminal energy saving method provided in embodiments of this application can be applied to various communication systems. For example, the terminal energy saving method provided in embodiments of this application can be applied to a long term evolution (long term evolution, LTE) system or a fifth-generation (fifth-generation, 5G) system, or other similar new future-oriented systems. This is not specifically limited in embodiments of this application. In addition, the term "system" can be used interchangeably with "network".

Figure 3:
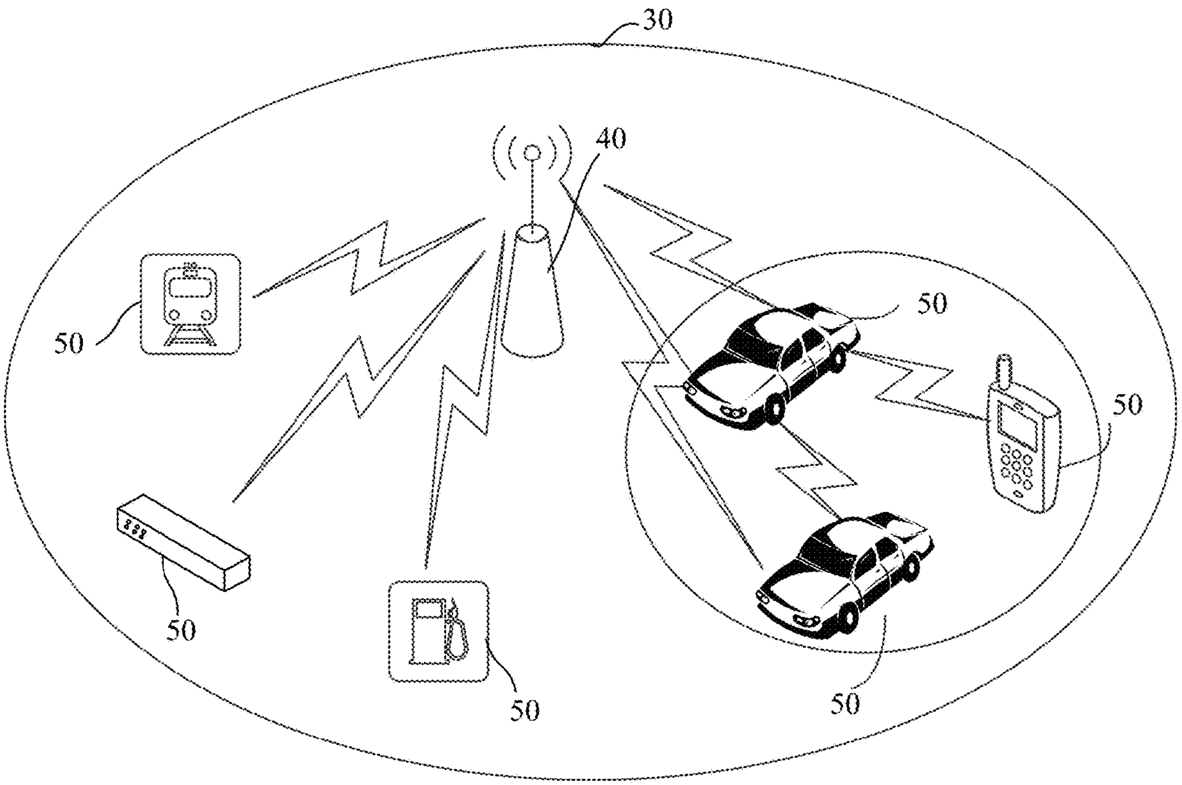
FIG. 3 is a schematic diagram of a structure of a communication system according to an embodiment of this application.

FIG. 3 shows a communication system 30 according to an embodiment of this application. The communication system 30 includes a network device 40 and terminal devices 50 connected to the network device 40. The terminal device 50 is connected to the network device 40 in a wireless manner. Optionally, different terminal devices 50 may communicate with each other. The terminal device 50 may be at fixed locations or mobile.

It should be noted that FIG. 3 is only a schematic diagram, although not shown, the communication system 30 may also include other network devices. For example, the communication system 30 may also include one or more of a core network device, a wireless relay device, and a wireless backhaul device, which is not specifically limited herein. The network device may be connected to the core network device in a wireless or wired manner. The core network device and the network device 40 may be independent and different physical devices; or functions of the core network device and logical functions of the network device 40 may be integrated on the same physical device; or some functions of the core network device and some functions of the network device 40 are integrated on one physical device; which is not specifically limited in embodiments of this application.

By using interaction between the network device 40 and any terminal device 50 shown in FIG. 3 as an example, in a possible implementation, the network device 40 is configured to send first information to the terminal device 50. The terminal device 50 is configured to receive the first information from the network device 40, where the first information is used by the terminal device 50 to determine a first CDRX cycle corresponding to the terminal device 50. The terminal device 50 is further configured to determine, according to the first CDRX cycle and a first calculation rule, a moment at which the terminal device 50 enters activation duration, where the first calculation rule is used for controlling the moment at which the terminal device 50 enters the activation duration to match a moment at which the network device 40 sends a downlink frame of a first service according to a service cycle. A specific implementation of this solution is described in detail in subsequent method embodiments. Details are not described herein.

Alternatively, by using interaction between the network device 40 and any terminal device 50 shown in FIG. 3 as an example, in another possible implementation, the network device 40 is configured to send second information to the terminal device 50. The terminal device 50 is configured to receive the second information from the network device 40, where the second information is used by the terminal device 50 to determine one or more CDRX cycles in a plurality of CDRX cycles configured by the network device 40 for the terminal device 50, and the one or more CDRX cycles are used for controlling a moment at which the terminal device 50 enters activation duration to match a moment at which the network device 40 sends a downlink frame of a first service according to a service cycle. The terminal device 50 is further configured to determine, according to the one or more CDRX cycles, the moment at which the terminal device 50 enters the activation duration. A specific implementation and technical effects of this solution are described in detail in subsequent method embodiments. Details are not described herein.

Alternatively, by using interaction between the network device 40 and any terminal device 50 shown in FIG. 3 as an example, in still another possible implementation, the network device 40 is configured to send fourth information to the terminal device 50. The terminal device 50 is configured to receive the fourth information from the network device 40, where the fourth information indicates a moment at which the terminal device 50 enters activation duration next time after receiving a first downlink frame of a first service; the moment at which the terminal device 50 enters the activation duration next time matches a moment at which the network device 40 sends a second downlink frame of the first service; and the second downlink frame is a first downlink frame sent by the network device 40 according to a service cycle after the first downlink frame. The terminal device 50 is further configured to determine, according to the fourth information, the moment at which the terminal device 50 enters the activation duration next time after receiving the first downlink frame. A specific implementation and technical effects of this solution are described in detail in subsequent method embodiments. Details are not described herein.

Optionally, the network device 40 in this embodiment of this application is a device that connects the terminal device 50 to a wireless network, and may be a base station (base station), an evolved NodeB (evolved NodeB, eNodeB), a transmission and reception point (transmission reception point, TRP), a next generation NodeB (next generation NodeB, gNB) in a 5G mobile communication system, a base station in a future mobile communication system or an access node in a wireless-fidelity (wireless-fidelity, Wi-Fi) system, or the like; or may be a module or unit that completes some functions of a base station, for example, may be a central unit (central unit, CU) or a distributed unit (distributed unit, DU). A specific technology and a specific device form that are used by the network device are not limited in embodiments of this application. In this application, unless otherwise specified, network devices refer to wireless access network devices.

Optionally, the terminal device 50 in embodiments of this application may be a device, such as a terminal or a chip that can be used in the terminal, configured to implement a wireless communication function. The terminal may also be referred to as user equipment (user equipment, UE), a mobile station, a mobile terminal, and the like. The terminal may be a mobile phone, a tablet computer, a computer with wireless transceiver function, a virtual reality terminal device, an augmented reality terminal device, a wireless terminal in industrial control, a wireless terminal in unmanned driving, a wireless terminal in remote surgery, a wireless terminal in smart grids, a wireless terminal in transportation security, a wireless terminal in smart cities, a wireless terminal in smart homes, and the like. A specific technology and a specific device form that are used by the terminal device are not limited in embodiments of this application.

Optionally, the network device 40 and the terminal device 50 in this embodiment of this application may be deployed on land, including indoor, outdoor, handheld, or vehicle-mounted, or may be deployed on water, or may be deployed on an airplane, a balloon, or an artificial satellite in the air. Application scenarios of the network device 40 and the terminal device 50 are not limited in embodiments of this application.

Optionally, communication between the network device 40 and the terminal device 50 in this embodiment of this application may be performed by using a licensed spectrum, may be performed by using an unlicensed spectrum, or may be performed by using both a licensed spectrum and an unlicensed spectrum. Optionally, communication between the network device 40 and the terminal device 50 may be performed by using a spectrum below 6 gigahertz (gigahertz, GHz), may be performed by using a spectrum above 6 GHz, or may be performed by using both a spectrum below 6 Ghz and a spectrum above 6 GHz. A spectrum resource used between the network device 40 and the terminal device 50 is not limited in this embodiment of this application.

Optionally, the network device 40 and the terminal device 50 in this embodiment of this application may also be referred to as communication apparatuses, and each may be a general-purpose device or a dedicated device. This is not specifically limited in this embodiment of this application.

Figure 4:
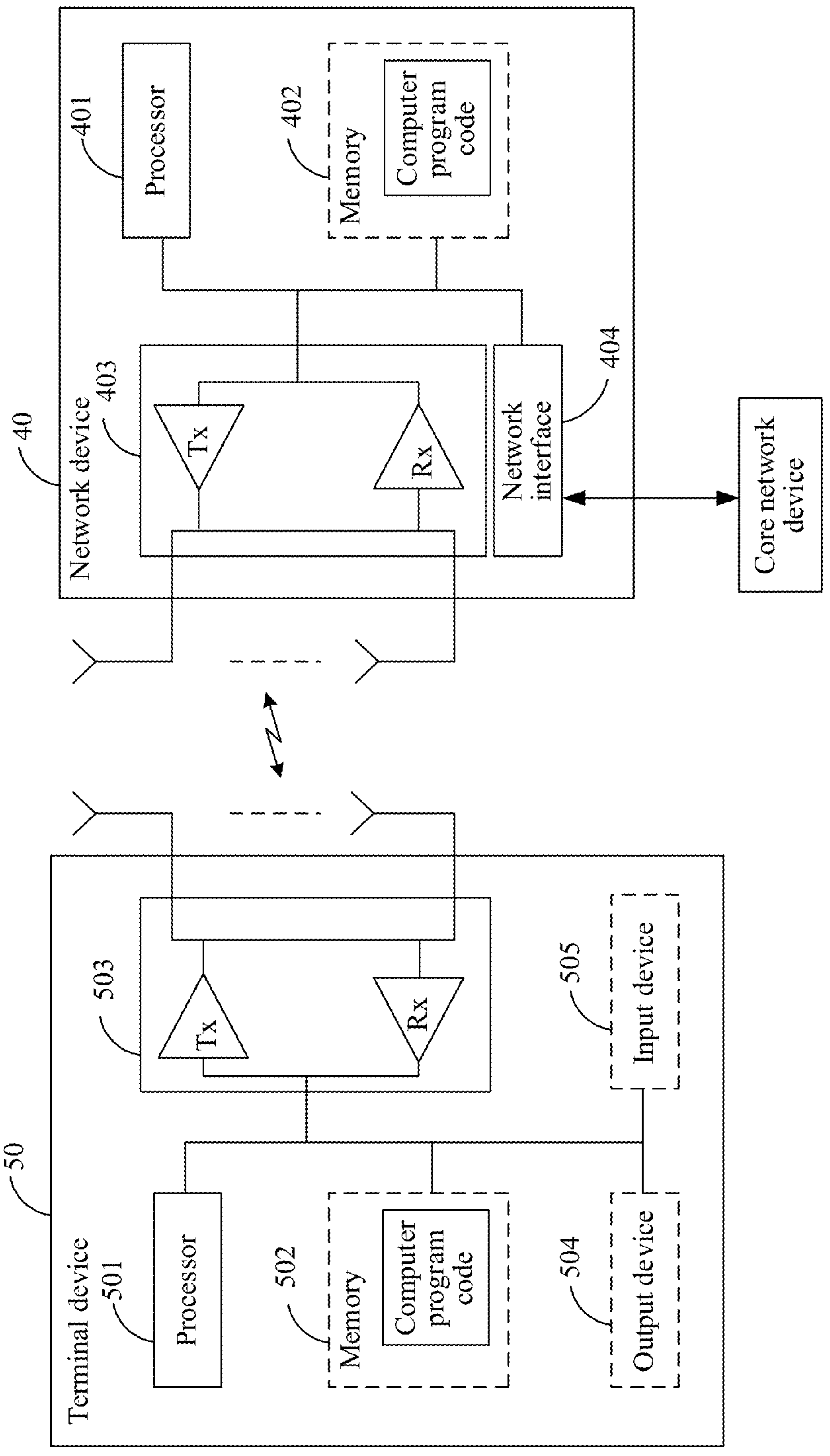
FIG. 4 is a schematic diagram of structures of a network device and a terminal device according to an embodiment of this application.

Optionally, FIG. 4 is a schematic diagram of structures of the network device 40 and the terminal device 50 according to an embodiment of this application.

The terminal device 50 includes at least one processor 501 and at least one transceiver 503. Optionally, the terminal device 50 may further include at least one memory 502, at least one output device 504, or at least one input device 505.

The processor 501, the memory 502, and the transceiver 503 are connected to each other through a communication line. The communication line may include a path for transmitting information between the foregoing components.

The processor 501 may be a general-purpose central processing unit (central processing unit, CPU), or may be other general-purpose processors, digital signal processors (digital signal processor, DSP), application-specific integrated circuits (application specific integrated circuit, ASIC), field programmable gate arrays (field-programmable gate array, FPGA) or other programmable logic devices, transistor logic devices, hardware components, or any combination thereof. The general-purpose processor may be a microprocessor or any regular processor or the like. In specific implementation, in an embodiment, the processor 501 may include a plurality of CPUs, and the processor 501 may be a single-core processor or a multi-core processor. The processor herein may be one or more devices, circuits, and/or processing cores used for data processing.

The memory 502 may be an apparatus having a storage function. For example, the memory may be a read-only memory (read-only memory, ROM), another type of static storage device that can store static information and instructions, a random access memory (random access memory, RAM), or another type of dynamic storage device that can store information and instructions; or may be a programmable read-only memory (programmable ROM, PROM), an erasable programmable read-only memory (erasable PROM, EPROM), an electrically erasable programmable read-only memory (electrically erasable programmable read-only memory, EEPROM), a compact disc read-only memory (compact disc read-only memory, CD-ROM) or another optical disk storage, an optical disc storage (including a compact optical disc, a laser disc, an optical disc, a digital versatile disc, a Blu-ray disc, or the like), a magnetic disk storage medium or other magnetic storage devices, or any other medium that can be configured to carry or store expected program code in a form of an instruction or a data structure and that is accessible to a computer. However, this does not constitute a limitation. The memory 502 may exist independently, and is connected to the processor 501 through the communication line. Alternatively, the memory 502 may be integrated with the processor 501.

The memory 502 is configured to store computer executable instructions for performing the solution in this application, and the processor 501 controls execution. Specifically, the processor 501 is configured to execute the computer executable instructions stored in the memory 502, to implement the terminal energy saving method in embodiments of this application.

Alternatively, optionally, in this embodiment of this application, the processor 501 may also perform functions related to processing in the terminal energy saving method provided in the following embodiment of this application, and the transceiver 503 is responsible for communicating with other devices or communication networks. Embodiments of this application impose no specific limitation thereon.

Optionally, the computer executable instructions in this embodiment of this application may also be referred to as application program code or computer program code. This is not specifically limited in this embodiment of this application.

The transceiver 503 may be configured to communicate, by using any apparatus like a transceiver, with another device or a communication network, such as Ethernet, a radio access network (radio access network, RAN), or a wireless local area network (wireless local area networks, WLAN). The transceiver 503 includes a transmitter (transmitter, Tx) and a receiver (receiver, Rx).

The output device 504 communicates with the processor 501, and may display information in a plurality of manners. For example, the output device 504 may be a liquid crystal display (liquid crystal display, LCD), a light emitting diode (light emitting diode, LED) display device, a cathode ray tube (cathode ray tube, CRT) display device, a projector (projector), or the like.

The input device 505 communicates with the processor 501, and may receive an input from a user in a plurality of manners. For example, the input device 505 may be a mouse, a keyboard, a touchscreen device, or a sensor device.

The network device 40 includes at least one processor 401, at least one transceiver 403, and at least one network interface 404. Optionally, the network device 40 may further include at least one memory 402. The processor 401, the memory 402, the transceiver 403, and the network interface 404 are connected through a communication line. The network interface 404 is configured to connect to a core network device through a link (for example, an S1 interface), or connect to a network interface of another network device through a wired or wireless link (for example, an X2 interface) (not shown in FIG. 3). This is not specifically limited in this embodiment of this application. In addition, for descriptions about the processor 401, the memory 402, and the transceiver 403, refer to descriptions about the processor 501, the memory 502, and the transceiver 503 in the terminal device 50. Details are not described again herein.

Figure 5:
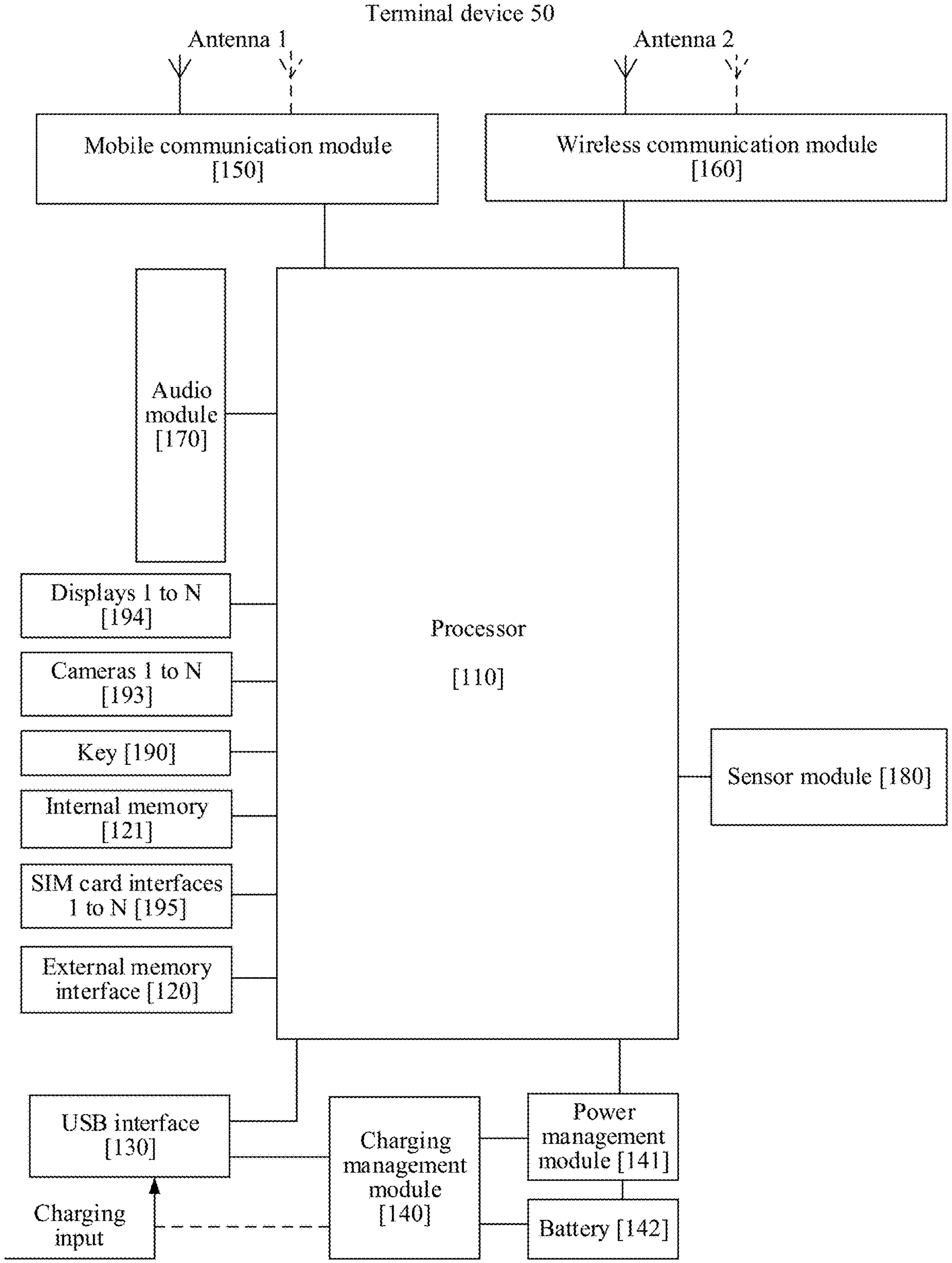
FIG. 5 is a schematic diagram of another structure of a terminal device according to an embodiment of this application.

With reference to the schematic diagram of the structure of the terminal device 50 shown in FIG. 4, for example, FIG. 5 is a specific structural form of the terminal device 50 according to an embodiment of this application.

In some embodiments, functions of the processor 501 in FIG. 4 may be implemented by a processor 110 in FIG. 5.

In some embodiments, functions of the transceiver 503 in FIG. 4 may be implemented by an antenna 1, an antenna 2, a mobile communication module 150, a wireless communication module 160, and the like in FIG. 5. The mobile communication module 150 may provide wireless communication technical solutions for application to the terminal device 50, which include LTE, NR, future communication, or the like. The wireless communication module 160 may provide wireless communication technical solutions for application to the terminal device 50, which include, for example, a WLAN (for example, a Wi-Fi network), BT (blue tooth, BT), a global navigation satellite system (global navigation satellite system, GNSS), frequency modulation (frequency modulation, FM), near field communication (near field communication, NFC), and infrared (infrared, IR). In some embodiments, the antenna 1 of the terminal device 50 is coupled to the mobile communication module 150, and the antenna 2 is coupled to the wireless communication module 160, so that the terminal device 50 can communicate with a network and another device by using a wireless communication technology.

In some embodiments, the functions of the memory 502 in FIG. 4 may be implemented by an internal memory 121 in FIG. 5, an external memory connected by using an external memory interface 120, or the like.

In some embodiments, functions of the output device 504 in FIG. 4 may be implemented by a display 194 in FIG. 5.

In some embodiments, functions of the input device 505 in FIG. 4 may be implemented by a mouse, a keyboard, a touchscreen device, or a sensor module 180 in FIG. 5.

In some embodiments, as shown in FIG. 4, the terminal device 50 may further include one or more of an audio module 170, a camera 193, a key 190, a SIM card interface 195, a USB interface 130, a charging management module 140, a power management module 141, and a battery 142.

It may be understood that the structure shown in FIG. 5 constitutes no specific limitation on the terminal device 50. For example, in some other embodiments of this application, the terminal device 50 may include more or fewer components than those shown in the figure, or some components may be combined, some components may be split, or the components may be differently arranged. The components shown in the figure may be implemented by hardware, software, or a combination of software and hardware.

With reference to FIG. 1 to FIG. 5, the terminal energy saving method provided in embodiments of this application is described below by using interaction between the network device 40 and any terminal device 50 that are shown in FIG. 3 as an example.

It should be noted that in this embodiment of this application, the terminal device may indicate the moment at which the terminal device enters the activation duration in the form of a subframe number. Specifically, as can be learned from the foregoing description that the terminal device determines, according to formula (1) or (2), the moment at which the terminal device enters the activation duration, that the terminal device determines SFN and subframe number that satisfy formula (1) or (2) may also be understood as determining [(SFN×10)+subframe number] that satisfies formula (1) or (2). Therefore, the terminal device can represent the determined [(SFN×10)+subframe number] in the form of a subframe number. For example, the terminal device determines that formula (1) is satisfied when SFN=1 and subframe number=9. The terminal device determines, according to SFN×10+subframe number=19, that the subframe number when the terminal device enters the activation duration is 19. The length of one subframe is 1 ms. According to the value range of SFN and subframe number described above, in this embodiment of this application, the value of the subframe number when the terminal device enters the activation duration is any integer from 0 to 10239.

It should be noted that in this embodiment of this application, matching between the two can be understood as the two being equal or a distance between the two being within a specific threshold. The specific threshold is less than or equal to a length of on-duration configured by the network device for the terminal device. In other words, that the moment at which the terminal device enters the activation duration matches the moment at which the network device sends the downlink frame of the first service according to the service cycle may be understood as that each time the network device delivers a downlink frame of the first service, the terminal device can receive the downlink frame in the on-duration. Therefore, the terminal device does not waste power consumption, and the downlink frame of the first service does not wait until the terminal device enters the activation duration next time before it can be received, thereby satisfying the delay requirements of the first service.

It should be noted that, to briefly explain how the terminal device determines the moment at which the terminal device enters the activation duration, in this embodiment of this application, a slot offset (drx-slot offset) configured by the network device for the terminal device is 0. This is explained herein uniformly and is not repeated below.

Figure 6:
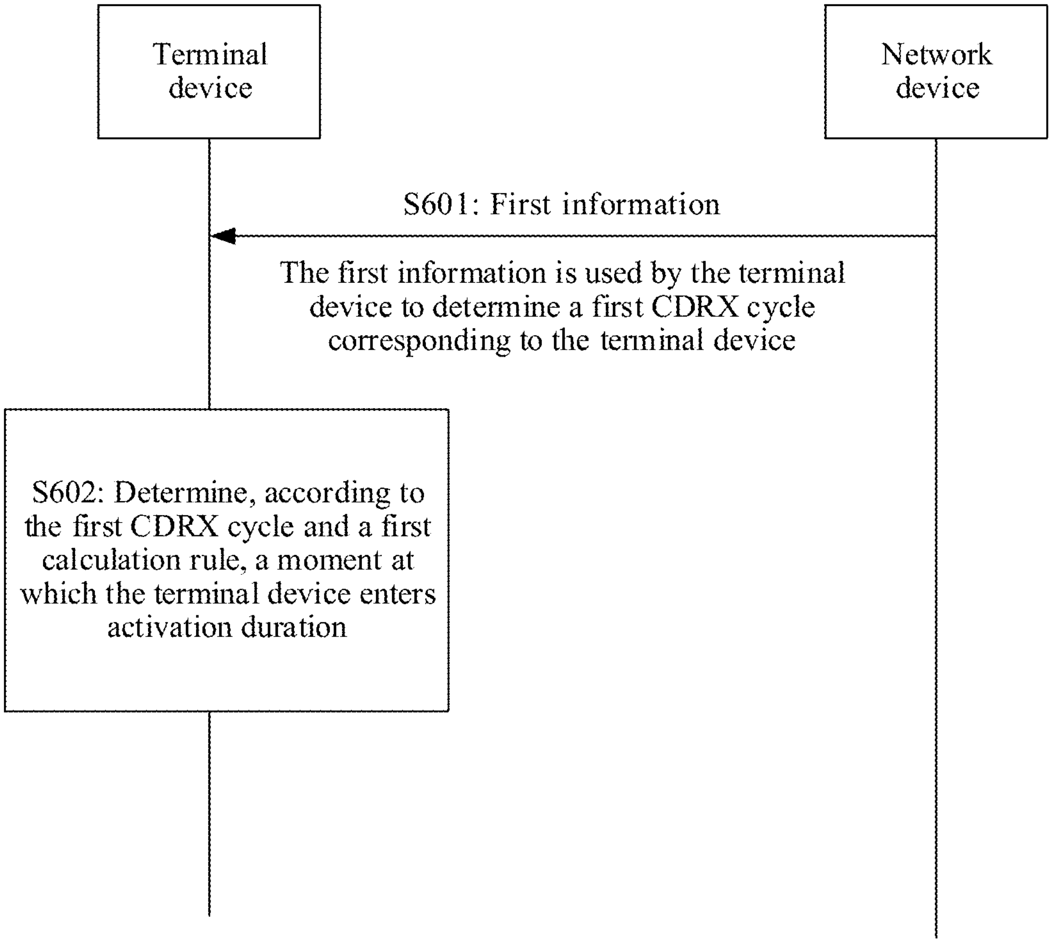
FIG. 6 is a schematic diagram of interaction of a first terminal energy saving method according to an embodiment of this application.

A terminal energy saving method provided in an embodiment of this application is described below. As shown in FIG. 6, the terminal energy saving method provided in this embodiment of this application includes the following steps S601 and S602.

S601: A network device sends first information to a terminal device. Correspondingly, the terminal device receives the first information from the network device, where the first information is used by the terminal device to determine a first CDRX cycle corresponding to the terminal device.

S602: The terminal device determines, according to the first CDRX cycle and a first calculation rule, a moment at which the terminal device enters activation duration, where the first calculation rule is used for controlling the moment at which the terminal device enters the activation duration to match a moment at which the network device sends the downlink frame of the first service according to the service cycle.

The following describes steps S601 and S602 in two specific embodiments.

Embodiment 1: In this solution, after the terminal device receives the first information from the network device, it can be determined according to the first information that the first CDRX cycle corresponding to the terminal device is a first CDRX cycle configured by the network device for the terminal device, where the first CDRX cycle is the same as the service cycle of the first service. In other words, the network device can configure the first CDRX cycle for the terminal device that is the same as the service cycle of the first service through the first information. It can be understood that after configuring the first CDRX cycle according to the first information, the terminal device continues to run the CDRX mechanism with the configured first CDRX cycle, until the first CDRX cycle is indicated to change according to information from the network device. Based on this solution, the terminal device can configure the first CDRX cycle that is the same as the service cycle of the first service according to the first information, to match the service cycle of the first service.

Optionally, the service cycle of the first service may be a decimal value. Correspondingly, the first CDRX cycle configured according to the first information is the same decimal value as the service cycle. For example, the first service is an XR service, and a service cycle is 8.33 ms. The network device sends the first information to the terminal device according to the service cycle of the first service, and configures the first CDRX cycle of the terminal device to 8.33 ms.

Optionally, in Embodiment 1 of this application, the first information may be carried in an RRC message. In other words, the network device semi-statically configures the first CDRX cycle in the terminal device through the RRC message.

In Embodiment 1 of this application, the network device can configure the first CDRX cycle for the terminal device through any form of first information in the following forms of first information:

The first information indicates the service cycle of the first service, or the first information indicates the first CDRX cycle, where the first CDRX cycle indicated by the first information is the same as the service cycle of the first service.

For the case that the first information indicates the service cycle of the first service, specifically, the first information is used for configuring the first CDRX cycle of the terminal device to the same cycle as the service cycle of the first service indicated by the first information. After receiving the first information, the terminal device determines the service cycle of the first service according to the first information, and configures the determined service cycle of the first service as the first CDRX cycle.

For the case that the first information indicates the first CDRX cycle, specifically, the first information is used for configuring the first CDRX cycle of the terminal device to the same cycle as the CDRX cycle indicated by the first information, and the first CDRX cycle indicated by the first information is the same as the service cycle of the first service.

Optionally, the first information includes the value of the first CDRX cycle. For example, the service cycle of the first service is 8.33 ms, and the first information sent by the network device includes the value 8.33 of the first CDRX cycle. After receiving the first information, the terminal device configures the first CDRX cycle to 8.33 ms according to the first information and the predetermined unit ms of the first CDRX cycle.

Alternatively, optionally, the first information includes a frequency of the first CDRX cycle. For example, the service cycle of the first service is 8.33 ms, and the first information sent by the network device includes the value 120 of the frequency of the first CDRX cycle. After receiving the first information, the terminal device calculates the first CDRX cycle as (1000/120) ms according to a predetermined relationship between the first CDRX cycle and the frequency of the first CDRX cycle: the frequency of the first CDRX cycle is a quantity of CDRX cycles in one second, and predetermined unit ms of the first CDRX cycle. That is, the first CDRX cycle is approximately equal to 8.33 ms. Based on the calculation result, the terminal device configures the first CDRX cycle to 8.33 ms.

Alternatively, optionally, the first information includes a preset integer value. After receiving the first information, the terminal device can determine the first CDRX cycle according to the preset integer value and a preset relationship. For example, the preset integer value included in the first information is an integer value INTEGER, and the value of INTEGER is 833. The relationship between INTEGER and the first CDRX cycle is predetermined as the first CDRX cycle=INTEGER, and the unit is 0.01 ms. The terminal device configures the first CDRX cycle to 8.33 ms according to the first information and the predetermined relationship between INTEGER and the first CDRX cycle. For another example, the preset integer value included in the first information is an enumeration value ENUMERATED, and the value of ENUMERATED is 120. The relationship between ENUMERATED and the first CDRX cycle is predetermined as the first CDRX cycle=1/ENUMERATED, and the unit is ms. The terminal device configures the first CDRX cycle to 8.33 ms according to the first information and the predetermined relationship between ENUMERATED and the first CDRX cycle.

When the preset relationship is determined, the network device can determine the preset integer value according to the preset relationship and the service cycle of the first service, and send the first information including the preset integer value to the terminal device, so that the terminal device can determine the first CDRX cycle the same as the service cycle of the first service according to the preset relationship and the preset integer value.

Further, in this solution, the terminal device can determine, based on the first CDRX cycle determined according to the first information and the first calculation rule, the moment at which the terminal device enters the activation duration. The first calculation rule is used for controlling the moment at which the terminal device enters the activation duration to match a moment at which the network device sends a downlink frame of a first service according to a service cycle.

In a possible implementation, the first calculation rule in this solution satisfies the following relationship:

$$\lfloor[(\text{SFN}\times 10)+\text{subframe number}]\text{modulo}(\text{drx-cycle})\rfloor=\text{drx-StartOffset} \quad \text{formula (3); or}$$

$$\lfloor[(\text{SFN}\times 10)+\text{subframe number}]\text{modulo}(\text{drx-cycle})\rfloor=(\text{drx-StartOffset})\text{modulo }(\text{drx-cycle}) \quad \text{formula (4), where}$$

SFN represents a system frame number when the terminal device enters the activation duration; subframe number represents a subframe number in a system frame corresponding to the system frame number when the terminal device enters the activation duration; drx-cycle represents the first CDRX cycle; and drx-StartOffset represents a subframe offset before the terminal device enters the activation duration.

In the foregoing parameters, for the values of drx-StartOffset, SFN, and subframe number, refer to the description of the corresponding parameters in formula (1) or (2) above. Details are not described herein again.

To avoid ambiguity, the operation symbol in formula (3) or (4) is explained herein: $\lfloor a \rfloor$ means rounding down a. Details are not described again.

In Embodiment 1 of this application, when the first CDRX cycle is a long cycle, the first calculation rule satisfies formula (3); and when the first CDRX cycle is a short cycle, the first calculation rule satisfies formula (4). For how the terminal device determines, according to the first calculation rule and the first CDRX cycle, the moment at which the terminal device enters the activation duration, refer to the foregoing description of formula (1) or (2). Details are not described herein again.

In one aspect, when formula (1) or formula (2) for determining the terminal device entering the activation duration is used to calculate the CDRX cycle with a decimal value currently, the calculated subframe number when entering the activation duration is a decimal value. Consequently, the terminal device cannot determine, according to the decimal-valued subframe number, the corresponding moment of entering the activation duration. By contrast, in Embodiment 1 of this application, when the first CDRX cycle is a decimal value, the terminal device can determine, according to formula (3) or (4), the integer-valued subframe number of entering the activation duration, so that the activation duration can be entered at the moment corresponding to the determined subframe number. In another aspect, when the first CDRX cycle is an integer value, the moment that is determined by the terminal device according to formula (3) or (4) and at which the terminal device enters the activation duration is the same as the moment that is determined by the terminal device according to formula (1) or (2) and at which the terminal device enters the activation duration. As can be learned, formula (3) or (4) provided in Embodiment 1 of this application is compatible with integer-valued CDRX cycles and decimal-valued CDRX cycles.

For ease of understanding, the following is an exemplary description of how to implement in Embodiment 1 of this application that the moment at which the terminal device enters the activation duration matches the moment at which the network device sends the downlink frame of the first service according to the service cycle. Assuming that the service cycle of the first service is 8.33 ms, the first CDRX cycle configured according to the first information is also 8.33 ms, and the length of the on-duration configured by the network device for the terminal device is 2 ms. If the downlink frame of the first service is sent for the first time at 0 ms, and the subframe number when the terminal device enters the activation duration for the first time is also 0 (corresponding to 0 ms), starting from 0 ms, a sending moment of each downlink frame of the first service and a subframe number each time the terminal device enters the activation duration are as shown in Table 1 below:

TABLE 1

| Moment at which the downlink frame of the first service is sent | Subframe number when the terminal device enters the activation duration | Interval |
|---|---|---|
| 0 | 0 | |
| 8.33 | 9 | 9 |
| 16.66 | 17 | 8 |
| 24.99 | 25 | 8 |
| 33.32 | 34 | 9 |
| 41.65 | 42 | 8 |
| 49.98 | 50 | 8 |
| 58.31 | 59 | 9 |
| 66.64 | 67 | 8 |
| 74.97 | 75 | 8 |
| 83.3 | 84 | 9 |
| 91.63 | 92 | 8 |
| 99.96 | 100 | 8 |

In Table 1, the moment at which the downlink frame of the first service is sent is a moment at which the network device sends the downlink frame of the first service to the terminal device each time according to the service cycle of the first service, and the unit is ms. The subframe number when the terminal device enters the activation duration is the subframe number determined by terminal device that satisfies [(SFN×10)+subframe number] in formula (3) or (4). The interval refers to duration between a moment (subframe number) at which the terminal device enters the activation duration last time and a moment (subframe number) at which the terminal device enters the activation duration next time, and the unit is ms.

In Table 1, the subframe number when the terminal device enters the activation duration is determined by the terminal device according to the first CDRX cycle being 8.33 ms and formula (3) or formula (4). As can be learned from the foregoing table, after the method provided in Embodiment 1 of this application is used, a difference between a moment at which the terminal device enters the activation duration each time and the sending moment of the corresponding downlink frame of the first service is within 1 ms, and is less than the length 2 ms of the on-duration. It can be understood that the terminal device can receive the corresponding downlink frame of the first service each time the terminal device is in the activation duration. It can be learned that by using the method in Embodiment 1 of this application, the moment at which the terminal device enters the activation duration each time matches the sending moment of the downlink frame of the first service. The terminal device does not waste power consumption and can satisfy the delay requirements of the first service.

Embodiment 2: In this solution, after the terminal device receives the first information from the network device, it can be determined according to the first information that the first CDRX cycle corresponding to the terminal device is a first CDRX cycle obtained by the terminal device by adjusting the CDRX cycle configured for the terminal device according to the first information. In other words, before the terminal device receives the first information, the network device configures the CDRX cycle for the terminal device. After receiving the first information, the terminal device adjusts the configured CDRX cycle according to the first information to obtain the first CDRX cycle.

Optionally, before the terminal device receives the first information, the configured CDRX cycle may be a CDRX cycle semi-statically configured in the terminal device by the network device through an RRC message.

Optionally, in Embodiment 2 of this application, the first information may be carried in a media access control layer (media access control layer, MAC Layer) control element (control element, CE) message. In other words, the network device can dynamically adjust the CDRX cycle of the terminal device through the MAC CE message.

It should be noted that the MAC CE in this embodiment of this application may be a newly defined MAC CE, and the newly defined MAC CE may be understood as a MAC CE with a newly defined logical channel identity (logical channel identify, LCID). Alternatively, the MAC CE in this embodiment of this application may be a MAC CE that reuses an existing LCID and defines new control rules for a data body. This is explained herein uniformly and is not repeated below.

Optionally, in Embodiment 2 of this application, the first information may be carried in the last data packet included in the downlink frame of the first service. After receiving the first information in the activation duration, the terminal device determines, according to the first information, a moment of entering the activation duration next time.

Optionally, in Embodiment 2 of this application, if the first information is carried in the last data packet included in the downlink frame of the first service, the first information may further indicate that the terminal device enters deactivation duration after receiving the downlink frame. In other words, the terminal device enters the deactivation duration after receiving the first information.

In Embodiment 2 of this application, the first information may include a cycle adjustment value configured by the network device, and the terminal device adjusts the configured CDRX cycle according to the received cycle adjustment value. Further, the terminal device may determine the cycle offset value according to the cycle adjustment value included in the first information, and then adjust the configured CDRX cycle according to the cycle offset value.

For example, the following describes how to carry the first information in the MAC CE message in Embodiment 2 of this application.

Figure 7:
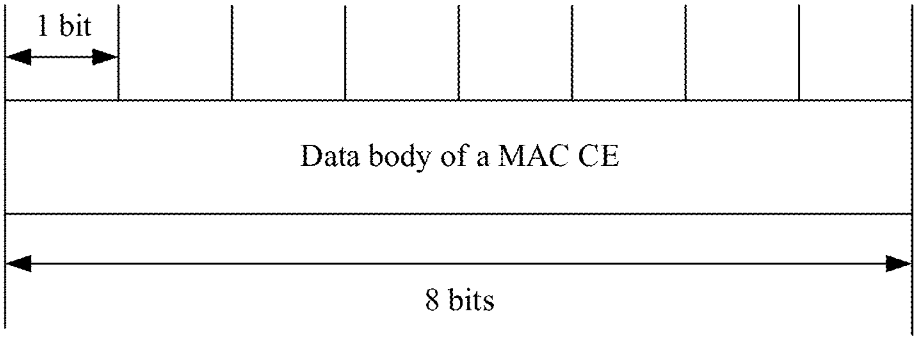
FIG. 7 is a schematic diagram of a MAC CE according to an embodiment of this application.

For example, as shown in FIG. 7, a MAC CE with a data body length of 8 bits (bit) is defined. An LCID of the MAC CE indicates that the MAC CE is used to adjust a configured CDRX cycle. The value of the data body of the MAC CE is N, and the value of N represents a cycle adjustment value. The value of N ranges from 0 to 255. The network device sends the MAC CE to the terminal device. After receiving the MAC CE, the terminal device determines, according to the LCID of the MAC CE, that the MAC CE is used to adjust the configured CDRX cycle, and then determines, according to the value of N and a preset rule, the cycle offset value. For example, the value of N is 200, and the terminal device determines that the cycle offset value is 73 according to the cycle offset value=(N−127). The positive and negative values of the cycle offset value can also indicate an offset direction of the CDRX cycle. For example, if the cycle offset value is positive, it means that the CDRX cycle is offset backward in time domain; and if the cycle offset value is negative, it means that the CDRX cycle is offset forward in time domain. In Embodiment 2 of this application, the unit of the cycle offset value may be slot (slot), symbol (symbol), or ms.

The following describes how the terminal device adjusts the configured CDRX cycle according to the first information to obtain the first CDRX cycle. In a possible implementation, the value of the CDRX cycle configured for the terminal device before receiving the first information remains unchanged, and each time the terminal device receives the first information, adjustment is performed based on the configured CDRX cycle, to determine the first CDRX cycle. This manner may be referred to as a non-memory manner. For example, the CDRX cycle configured for the terminal device before receiving the first information is 8 ms. After receiving the first information for the first time, the terminal device adjusts the configured CDRX cycle of 8 ms to obtain the first CDRX cycle. After receiving the first information for the second time, the terminal device still adjusts the configured CDRX cycle of 8 ms to obtain the first CDRX cycle.

In a possible implementation, the first calculation rule in this implementation satisfies the following relationship:

$$[(\text{SFN}\times 10)+\text{subframe number}]\,\text{modulo}(\text{drx-Cycle}+\text{cycle-adjust})=\text{drx-StartOffset} \quad \text{formula (5); or}$$

$$[(\text{SFN}\times 10)+\text{subframe number}]\,\text{modulo}(\text{drx-cycle}+\text{cycle-adjust})=(\text{drx-StartOffset})\,\text{modulo}(\text{drx-cycle}+\text{cycle-adjust}) \quad \text{formula (6), where}$$

SFN represents a system frame number when the terminal device enters the activation duration; subframe number represents a subframe number in a system frame corresponding to the system frame number when the terminal device enters the activation duration; drx-cycle represents a CDRX cycle configured by the network device for the terminal device; cycle-adjust represents a cycle offset value determined by the terminal device according to the first information; (drx-cycle+cycle-adjust) represents the first CDRX cycle corresponding to the terminal device (in other words, represents the first CDRX cycle obtained by adjusting the configured CDRX cycle); and drx-StartOffset represents a subframe offset before the terminal device enters the activation duration.

In the foregoing parameters, for the values of drx-StartOffset, SFN, and subframe number, refer to the description of the corresponding parameters in formula (1) or (2) above. Details are not described herein again.

In Embodiment 2 of this application, when the first CDRX cycle is a long cycle, the first calculation rule satisfies formula (5); and when the first CDRX cycle is a short cycle, the first calculation rule satisfies formula (6). For how the terminal device determines, according to the first calculation rule and the first CDRX cycle, the moment at which the terminal device enters the activation duration, refer to the foregoing description of formula (1) or (2). Details are not described herein again.

In another possible implementation, the CDRX cycle configured for the terminal device is updated with each received first information. In this implementation, after receiving the first information, the terminal device adjusts the CDRX cycle previously configured for the terminal device to obtain the first CDRX cycle, and configures the first CDRX cycle in the terminal device as the updated configured CDRX cycle. This manner may be referred to as a memory manner. For example, the CDRX cycle configured for the terminal device before receiving the first information is 8 ms. After receiving the first information for the first time, the terminal device adjusts the configured CDRX cycle of 8 ms to obtain the first CDRX cycle being 8.33 ms, and configures the first CDRX cycle in the terminal device. After receiving the first information for the second time, the terminal device adjusts the configured CDRX cycle of 8.33 ms to obtain the first CDRX cycle.

In a possible implementation, the first calculation rule in this implementation satisfies the following relationship:

$$[(\text{SFN}\times 10)+\text{subframe number}]\,\text{modulo}(\text{drx-CycleN})=\text{drx-StartOffset} \quad \text{formula (7); or}$$

$$[(\text{SFN}\times 10)+\text{subframe number}]\,\text{modulo}(\text{drx-cycleN})=(\text{drx-StartOffset})\,\text{modulo}(\text{drx-cycleN}) \quad \text{formula (8), where}$$

SFN represents a system frame number when the terminal device enters the activation duration; subframe number represents a subframe number in a system frame corresponding to the system frame number when the terminal device enters the activation duration; drx-cycleN represents the first CDRX cycle corresponding to the terminal device (in other words, represents the first CDRX cycle obtained by adjusting the configured CDRX cycle); and drx-StartOffset represents a subframe offset before the terminal device enters the activation duration.

In the foregoing parameters, drx-CycleN satisfies the following relationship:

$$\text{drx-cycleN}=\text{drx-Cycle}(N-1)+\text{cycle-adjust} \quad \text{formula (9), where}$$

drx-cycle (N−1) represents a CDRX cycle configured before the terminal device enters the activation duration; when drx-cycle (N−1)=drx-cycle0, drx-cycle0 represents a CDRX cycle configured by the network device for the terminal device (in other words, represents the CDRX cycle configured by the network device for the terminal device before the terminal device receives the first information for the first time); and cycle-adjust represents a cycle offset value determined by the terminal device according to the first information.

In the foregoing parameters, for the values of drx-StartOffset, SFN, and subframe number, refer to the description of the corresponding parameters in formula (1) or (2) above. Details are not described herein again.

In Embodiment 2 of this application, when the first CDRX cycle is a long cycle, the first calculation rule satisfies formula (7); and when the first CDRX cycle is a short cycle, the first calculation rule satisfies formula (8). For how the terminal device determines, according to the first calculation rule and the first CDRX cycle, the moment at which the terminal device enters the activation duration, refer to the foregoing description of formula (1) or (2). Details are not described herein again.

In the foregoing steps S601 and S602, the actions of the terminal device may be executed by the processor 501 in the terminal device 50 shown in FIG. 4 by calling the application program code stored in the memory 502 to instruct the terminal device for execution. In the foregoing steps S601 and S602, the actions of the network device may be executed by the processor 401 in the network device 40 shown in FIG. 4 by calling the application program code stored in the memory 402 to instruct the network device for execution. This is not limited in this embodiment.

Figure 8:
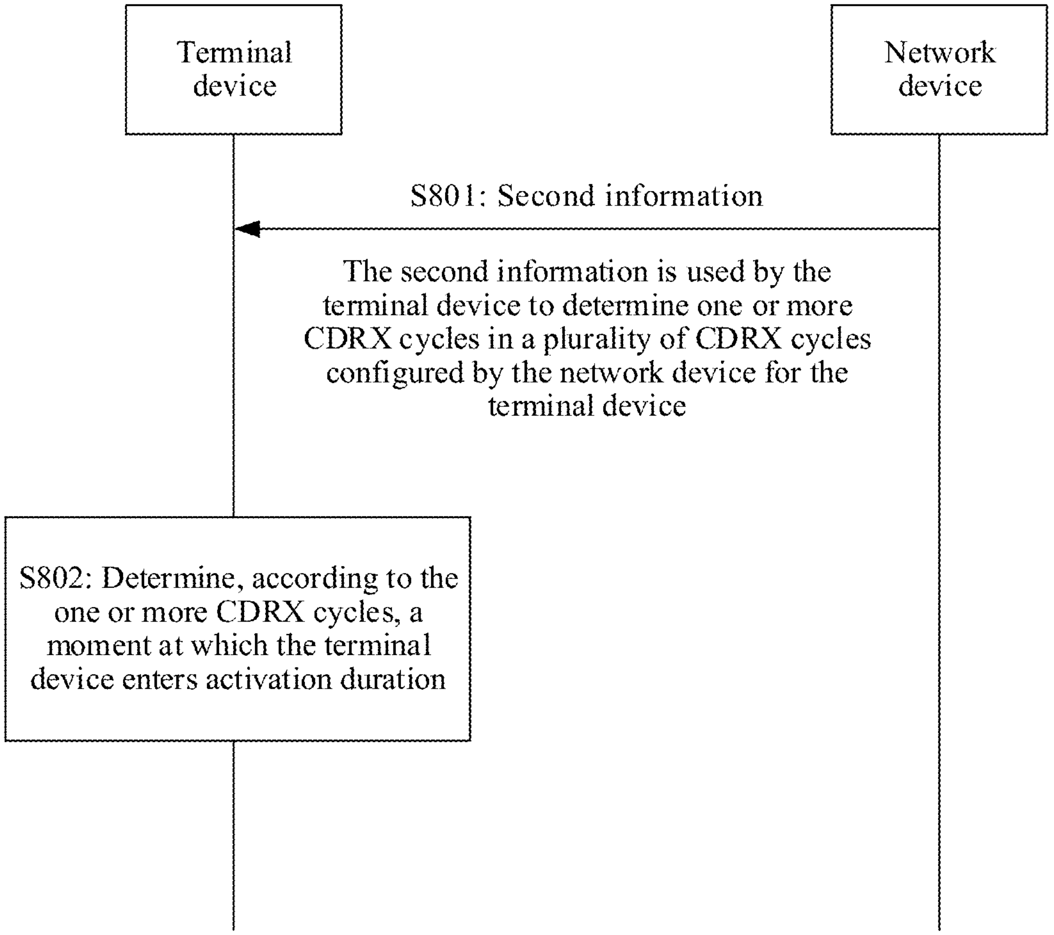
FIG. 8 is a schematic diagram of interaction of a second terminal energy saving method according to an embodiment of this application.

Another terminal energy saving method provided in an embodiment of this application is described below. As shown in FIG. 8, the terminal energy saving method provided in this embodiment of this application includes the following steps S801 and S802.

S801: A network device sends second information to a terminal device. Correspondingly, the terminal device receives the second information from the network device, where the second information is used by the terminal device to determine one or more CDRX cycles in a plurality of CDRX cycles configured by the network device for the terminal device, and the one or more CDRX cycles are used for controlling a moment at which the terminal device enters activation duration to match a moment at which the network device sends a downlink frame of a first service according to a service cycle.

S802: The terminal device determines, according to the one or more CDRX cycles, the moment at which the terminal device enters the activation duration.

It can be learned from the foregoing step S801 that the second information is used for determining one or more CDRX cycles in the plurality of CDRX cycles configured by the network device for the terminal device. Therefore, before the terminal device receives the second information, the network device has configured a plurality of CDRX cycles for the terminal device. The plurality of configured CDRX cycles may also be referred to as a configured CDRX cycle pool. Optionally, before the terminal device receives the second information, the terminal device may further receive third information from the network device, where the third information is used by the network device to configure the plurality of CDRX cycles for the terminal device, and the plurality of configured CDRX cycles include the one or more CDRX cycles determined by the terminal device according to the second information.

Specifically, the third information sent by the network device includes identification information corresponding to each CDRX cycle in the plurality of configured CDRX cycles, and configuration information of the CDRX cycle corresponding to the identification information. The terminal device may determine configuration information of each CDRX cycle in the plurality of CDRX cycles that need to be configured according to the identification information of the CDRX cycle and the corresponding configuration information, and then configure each CDRX cycle in the terminal device.

Optionally, in this embodiment of this application, the third information may be carried in an RRC message. In other words, the network device semi-statically configures the CDRX cycle pool including the plurality of CDRX cycles in the terminal device through the RRC message.

The following is an example of the third information provided in this embodiment of this application:

```
CDRX-Config::= SEQUENCE{
  cdrx-ToReleaseList SEQUENCE(SIZE(1...maxNrofCdrxs)) OF CDRX-Id,
    cdrx-ToAddModList SEQUENCE(SIZE(1...maxNrofCdrxs)) OF CDRX
}
CDRX::= SEQUENCE{
  cdrx-Id CDRX-Id,
  ... //cdrx specific configuration
}.
```

CDRX-Id represents the identification information of the CDRX cycle, and "cdrx specific configuration" represents the configuration information of the CDRX cycle corresponding to the CDRX-Id, for example, the value of the CDRX cycle.

Optionally, the network device may also carry, in the message carrying the third information, information indicating a type of downlink control information (downlink control information, DCI) received by the terminal device in the activation duration. After receiving the information, the terminal device receives the type of the DCI indicated by the information in the activation duration and does not receive other types of DCI. For example, the information may be: "dci-monitor ENUMERATED {downlink, uplink, both}//". Based on this solution, the terminal device can blindly detect only the corresponding type of DCI in the activation duration, thereby reducing a quantity of blind PDCCH detections and reducing the power consumption of the terminal device.

After the network device configures a plurality of CDRX cycles for the terminal device, steps S801 and S802 are described below in two specific embodiments.

Embodiment 3: In this solution, after receiving the second information from the network device, the terminal device can determine the plurality of cyclic CDRX cycles according to the second information, and the moment that corresponds to each CDRX cycle in the plurality of cyclic CDRX cycles and at which the terminal device enters the activation duration matches the moment at which the network device sends the downlink frame of the first service according to the service cycle.

Specifically, in Embodiment 3 of this application, the second information includes identification information corresponding to each CDRX cycle in the plurality of cyclic CDRX cycles, and a sequence of the identification information. The sequence of the identification information corresponds to a cyclic sequence of the plurality of cyclic CDRX cycles. The terminal device may use, according to the identification information of the CDRX cycle included in the second information, the CDRX cycle corresponding to the identification information as the CDRX cycle in the plurality of cyclic CDRX cycles in the plurality of CDRX cycles previously configured, and determine the cyclic sequence of the corresponding plurality of cyclic CDRX cycles according to the sequence of the identification information.

Optionally, in Embodiment 3 of this application, the second information may be carried in an RRC message; or the second information may be carried in a MAC CE message.

Optionally, in Embodiment 3 of this application, the second information may be carried in the last data packet included in the downlink frame of the first service. After receiving the second information in the activation duration, the terminal device determines, according to the second information, a moment of entering the activation duration next time.

Optionally, in Embodiment 3 of this application, if the second information is carried in the last data packet included in the downlink frame of the first service, the second information may further indicate that the terminal device enters deactivation duration after receiving the downlink frame. In other words, the terminal device enters the deactivation duration after receiving the second information.

For example, the following is the second information carried in the RRC message provided in Embodiment 3 of this application:

CDRX-PATTERN::=SEQUENCE {SIZE(1 . . . maxNrofCdrxs) OF CDRX-Id}.

CDRX-Id represents the identification information of the CDRX cycle. After receiving the RRC message, the terminal device determines the corresponding CDRX cycles in the configured CDRX cycle pool based on the CDRX-Ids in the message, and determines the cyclic sequence of the corresponding CDRX cycles based on the sequence of the CDRX-Ids. For example, the CDRX-Ids in the RRC message are 1 and 2. After the terminal device receives the RRC message, in the configured CDRX cycle pool, the CDRX cycle with the identifier of 1 and the CDRX cycle with the identifier of 2 are determined as a plurality of cyclic CDRX cycles according to a sequence {1, 2}.

Figure 9:
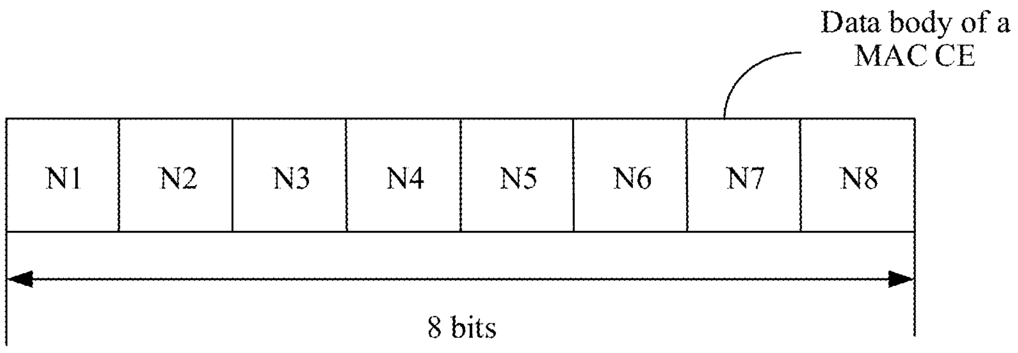
FIG. 9 is a schematic diagram of another MAC CE according to an embodiment of this application.

For example, the following describes how to carry the second information in the MAC CE message in Embodiment 3 of this application:

As shown in FIG. 9, a MAC CE with a data body length of 8 bits is defined. An LCID of the MAC CE indicates that the MAC CE is used to determine a plurality of cyclic CDRX cycles. Every two bits NxNy (N1N2, N3N4, N5N6, or N7N8) in the MAC CE represent identification information of one CDRX cycle. NxNy=00 represents an invalid configuration, NxNy=01 represents a CDRX cycle with the identifier of 1, and so on. NxNy=10 represents a CDRX cycle with the identifier of 2, and NxNy=11 represents a CDRX cycle with the identifier of 3. After receiving the MAC CE, the terminal device determines, according to the LCID of the MAC CE, that the MAC CE is used to determine a plurality of cyclic CDRX cycles, and then determines the plurality of cyclic CDRX cycles according to a value of each NxNy and a preset rule. For example, the network device issues a MAC CE with a bit value of 01111000. After receiving the MAC CE, the terminal device determines, in the configured CDRX cycle pool, the CDRX cycles with the identifier of 1, 3, or 2 as a plurality of cyclic CDRX cycles according to a sequence {1, 3, 2}.

In this solution, after determining the plurality of cyclic CDRX cycles, the terminal device can determine, according to the corresponding CDRX cycle and formula (1) or formula (2) according to the cyclic sequence of the plurality of cyclic CDRX cycles, the moment at which the terminal device enters the activation duration. For the specific determination process, refer to the description of formula (1) or formula (2) above. Details are not described herein.

For ease of understanding, the following is an exemplary description of how the terminal device implements in Embodiment 3 of this application that the moment that corresponds to each CDRX cycle in the plurality of cyclic CDRX cycles and at which the terminal device enters the activation duration matches the moment at which the network device sends the downlink frame of the first service according to the service cycle.

It is assumed that the service cycle of the first service is 8.33 ms, the downlink frame of the first service is sent for the first time at 0 ms, the subframe number when the terminal device enters the activation duration for the first time is also 0 (corresponding to 0 ms), and the terminal device receives the second information after entering the activation duration for the first time. The second information indicates that the plurality of cyclic CDRX cycles are {1, 1, 2}, where 1 or 2 is the identification information of the CDRX cycle. According to the second information, the terminal device determines, in the plurality of configured CDRX cycles, that the CDRX cycle with the identifier of 1 is 8 ms, and the CDRX cycle with the identifier of 2 is 9 ms. Therefore, the terminal device determines the moment of entering the activation duration each time according to the cyclic sequence {8 ms, 8 ms, 9 ms} of the CDRX cycles. A sending moment of each downlink frame of the first service and a subframe number each time the terminal device enters the activation duration are as shown in Table 2 below:

TABLE 2

| Moment at which the downlink frame of the first service is sent | Subframe number when the terminal device enters the activation duration | Interval |
|---|---|---|
| 0 | 0 | |
| 8.33 | 8 | 8 |
| 16.66 | 16 | 8 |
| 24.99 | 25 | 9 |
| 33.32 | 33 | 8 |
| 41.65 | 41 | 8 |
| 49.98 | 50 | 9 |
| 58.31 | 58 | 8 |
| 66.64 | 66 | 8 |
| 74.97 | 75 | 9 |
| 83.3 | 83 | 8 |
| 91.63 | 91 | 8 |
| 99.96 | 100 | 9 |

In Table 2, for the moment at which the downlink frame of the first service is sent, the subframe number when the terminal device enters the activation duration, and the interval, refer to the foregoing description of Table 1. Details are not described herein again.

In Table 2, the subframe number when the terminal device enters the activation duration is determined by the terminal device according to a plurality of cyclic CDRX cycles of {8 ms, 8 ms, 9 ms} and formula (1) or formula (2). As can be learned from the foregoing table, after the method provided in Embodiment 2 of this application is used, a difference between a moment at which the terminal device enters the activation duration each time and the sending moment of the corresponding downlink frame of the first service is within 1 ms. It can be understood that the terminal device can receive the corresponding downlink frame of the first service each time the terminal device is in the activation duration. Therefore, by using the method in Embodiment 2 of this application, the moment at which the terminal device enters the activation duration each time matches the sending moment of the downlink frame of the first service. The terminal device does not waste power consumption and can satisfy the delay requirements of the first service.

Embodiment 4: In this solution, after receiving the second information from the network device, the terminal device can determine the first CDRX cycles according to the second information, and the first CDRX cycles are used for controlling the moment at which the terminal device enters the activation duration to match the moment at which the network device sends the downlink frame of the first service according to the service cycle.

Specifically, in Embodiment 4 of this application, the second information includes identification information corresponding to the first CDRX cycle. The terminal device may use, in the configured CDRX cycle pool according to the identification information included in the second information, the CDRX cycle corresponding to the identification information as the first CDRX cycle.

Optionally, in Embodiment 4 of this application, the second information may be carried in an RRC message; or the second information may be carried in a MAC CE message.

Optionally, in Embodiment 4 of this application, the second information may be carried in the last data packet included in the downlink frame of the first service. After receiving the second information in the activation duration, the terminal device determines, according to the second information, a moment of entering the activation duration next time.

Optionally, in Embodiment 4 of this application, if the second information is carried in the last data packet included in the downlink frame of the first service, the second information may further indicate that the terminal device enters deactivation duration after receiving the downlink frame. In other words, the terminal device enters the deactivation duration after receiving the second information.

For example, the following is the second information carried in the RRC message provided in Embodiment 4 of this application:

CDRX-PATTERN:: =SEQUENCE {SIZE(1 . . . maxNrofCdrxs) OF CDRX-Id}.

CDRX-Id represents the identification information of the CDRX cycle. After receiving the RRC message, the terminal device determines the corresponding CDRX cycles in the configured CDRX cycle pool based on the CDRX-Ids in the message as the first CDRX cycles. For example, the CDRX-Id in the RRC message is 1. After the terminal device receives the RRC message, in the configured CDRX cycle pool, the CDRX cycle with the identifier of 1 is determined as the first CDRX cycle.

For example, the following describes how to carry the second information in the MAC CE message in Embodiment 4 of this application:

As shown in FIG. 9, a MAC CE with a data body length of 8 bits is defined. An LCID of the MAC CE indicates that the MAC CE is used to determine the first CDRX cycles. Each bit in the MAC CE represents identification information of a CDRX cycle. For example, the first bit N1 represents the CDRX cycle with the identifier of 1, the second bit N2 represents the CDRX cycle with the identifier of 2, and so on. The eighth bit N8 represents the CDRX cycle with the identifier of 8. The value of the bit in the MAC CE can indicate whether the CDRX cycle represented by the bit is the first CDRX cycle. For example, the value of the bit being 0 indicates that the CDRX cycle represented by the bit is not the first CDRX cycle. The value of the bit being 1 indicates that the CDRX cycle represented by the bit is the first CDRX cycle. After receiving the MAC CE, the terminal device determines, according to the LCID of the MAC CE, that the MAC CE is used to determine the first CDRX cycle, and then determines, according to the value of each bit in the MAC CE and the preset rule, the first CDRX cycle in the configured CDRX cycle pool. For example, the network device issues a MAC CE with a bit value of 01000000. After receiving the MAC CE, the terminal device determines a CDRX with the identifier of 2 as the first CDRX cycle in the configured CDRX cycle pool.

In this solution, after determining the first CDRX cycles, the terminal device can determine, according to the first CDRX cycles and formula (1) or formula (2), the moment at which the terminal device enters the activation duration. For the specific determination process, refer to the description of formula (1) or formula (2) above. Details are not described herein.

For ease of understanding, the following is an exemplary description of how the terminal device implements in Embodiment 4 of this application that the moment that is determined according to the first CDRX cycle and at which the terminal device enters the activation duration matches the moment at which the network device sends the downlink frame of the first service according to the service cycle.

It is assumed that the service cycle of the first service is 8.33 ms, the downlink frame of the first service is sent for the first time at 0 ms, and the subframe number when the terminal device enters the activation duration for the first time is also 0 (corresponding to 0 ms). The terminal device receives second information for the first time after entering the activation duration for the first time. The second information includes an identifier 1. According to the second information, the terminal device determines, in the configured CDRX cycle pool, that a CDRX cycle with the identifier 1 is 8 ms, and determines, according to the first CDRX cycle being 8 ms, a moment of entering the activation duration for the second time. The terminal device receives second information for the second time after entering the activation duration for the second time. The second information includes an identifier 1. According to the second information, the terminal device determines, in the configured CDRX cycle pool, that a CDRX cycle with the identifier 1 is 8 ms, and determines, according to the first CDRX cycle being 8 ms, a moment of entering the activation duration for the third time. The terminal device receives second information for the third time after entering the activation duration for the third time. The second information includes an identifier 2. According to the second information, the terminal device determines, in the configured CDRX cycle pool, that a CDRX cycle with the identifier 2 is 9 ms, and determines, according to the first CDRX cycle being 9 ms, a moment of entering the activation duration for the fourth time. By analogy, the network device can continuously send second information to the terminal device to adjust a moment at which the terminal device enters the activation duration. For example, a sending moment of each downlink frame of the first service and a subframe number each time the terminal device enters the activation duration may be as shown in Table 2 above. As can be learned, based on this solution, the network device can continuously adjust the CDRX cycle of the terminal device by sending the second information, so that the moment at which the terminal device enters the activation duration matches the moment at which the network device sends the downlink frame of the first service according to the service cycle, thereby avoiding waste of power consumption of the terminal device and satisfying delay requirements of the first service.

In the foregoing steps S801 and S802, the actions of the terminal device may be executed by the processor 501 in the terminal device 50 shown in FIG. 4 by calling the application program code stored in the memory 502 to instruct the terminal device for execution. In the foregoing steps S801 and S802, the actions of the network device may be executed by the processor 401 in the network device 40 shown in FIG. 4 by calling the application program code stored in the memory 402 to instruct the network device for execution. This is not limited in this embodiment.

Figure 10:
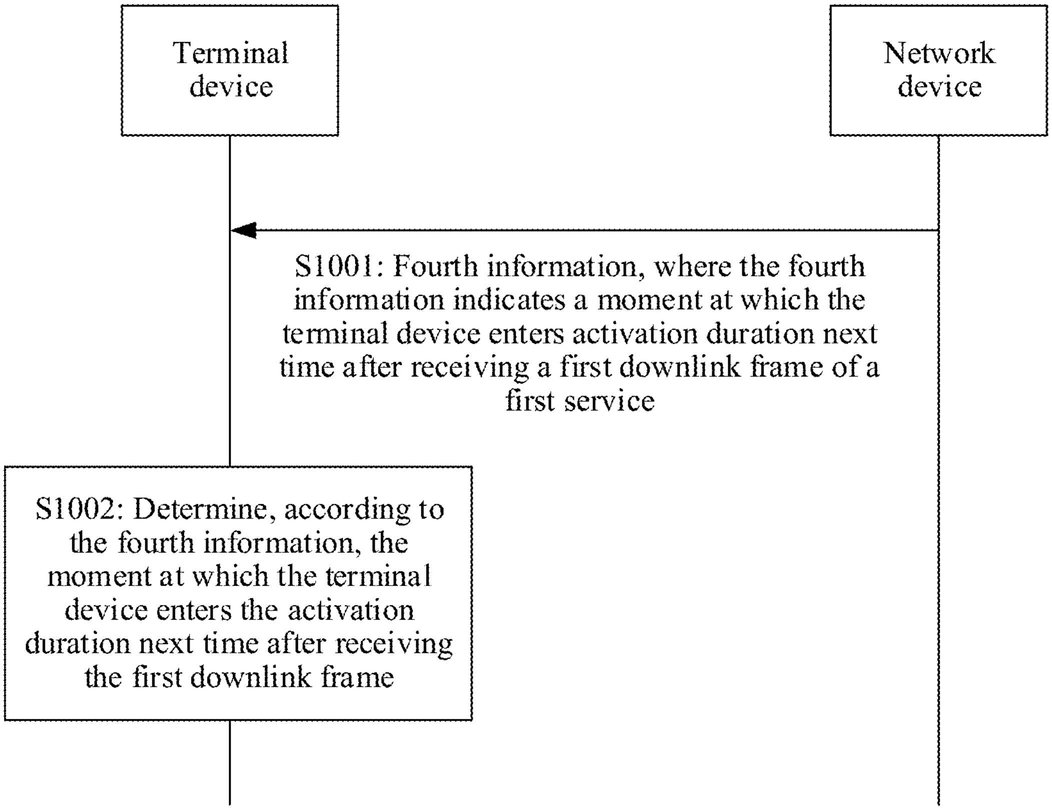
FIG. 10 is a schematic diagram of interaction of a third terminal energy saving method according to an embodiment of this application.

Still another terminal energy saving method provided in an embodiment of this application is described below. As shown in FIG. 10, the terminal energy saving method provided in this embodiment of this application includes the following steps S1001 and S1002.

S1001: A network device sends fourth information to a terminal device. Correspondingly, the terminal device receives the fourth information from the network device, where the fourth information indicates a moment at which the terminal device enters activation duration next time after receiving a first downlink frame of a first service; the moment at which the terminal device enters the activation duration next time matches a moment at which the network device sends a second downlink frame of the first service; and the second downlink frame is a first downlink frame sent by the network device according to a service cycle after the first downlink frame.

S1002: The terminal device determines, according to the fourth information, the moment at which the terminal device enters the activation duration next time after receiving the first downlink frame.

In this embodiment of this application, the terminal device receives the first downlink frame in the activation duration, and determines a moment indicated by the fourth information as the moment at which the terminal device enters the activation duration next time after receiving the first downlink frame.

Based on the method provided in this embodiment of this application, the network device can indicate, through the fourth information sent each time, the moment at which the terminal device enters the activation duration, to control the moment at which the terminal device enters the activation duration each time to match the moment at which the network device sends the downlink frame of the first service according to the service cycle of the first service.

Optionally, in this embodiment of this application, the fourth information may be carried in a last data packet included in the first downlink frame.

Optionally, in this embodiment of this application, the fourth information may further indicate that the terminal device enters deactivation time after receiving the first downlink frame. In other words, according to the fourth information, the terminal device enters the deactivation duration after receiving the first downlink frame, and enters the activation duration again at the moment indicated by the fourth information. Further, if the fourth information is carried in the last data packet included in the first downlink frame and further indicates that the terminal device enters deactivation time after receiving the first downlink frame, the terminal device immediately enters the deactivation duration after receiving the fourth information and enters the activation duration again at the moment indicated by the fourth information.

Optionally, in this embodiment of this application, the fourth information may be carried in a MAC CE message. In other words, the network device can dynamically adjust the moment at which the terminal device enters the activation duration each time through the MAC CE information.

For example, the following describes how to carry the fourth information in the MAC CE message in this embodiment of this application.

As shown in FIG. 7, a MAC CE with a data body length of 8 bits is defined. An LCID of the MAC CE indicates that the MAC CE indicates a moment at which the terminal device enters the activation duration. The value of the data body of the MAC CE is N. The value of N represents the moment at which the terminal device enters the activation duration. The value of N ranges from 0 to 255. After receiving the MAC CE, the terminal device determines, according to the LCID of the MAC CE, that the MAC CE is used to indicate the moment at which the terminal device enters the activation duration, and then determines, according to the value of N and a preset rule, the moment at which the terminal device enters the activation duration. The unit of the moment represented by the value of N and at which the terminal device enters the activation duration may be slot, ms, or symbol. For example, the network device carries the MAC CE in a last data packet included in a downlink frame of the first service and sends the MAC CE to the terminal device. After receiving the MAC CE, the terminal device enters the deactivation duration and determines that the value of N of the MAC CE is 10. The terminal device enters the activation duration again after 10 slots.

In the foregoing steps S1001 and S1002, the actions of the terminal device may be executed by the processor 501 in the terminal device 50 shown in FIG. 4 by calling the application program code stored in the memory 502 to instruct the terminal device for execution. In the foregoing steps S1001 and S1002, the actions of the network device may be executed by the processor 401 in the network device 40 shown in FIG. 4 by calling the application program code stored in the memory 402 to instruct the network device for execution. This is not limited in this embodiment.

Figure 11:
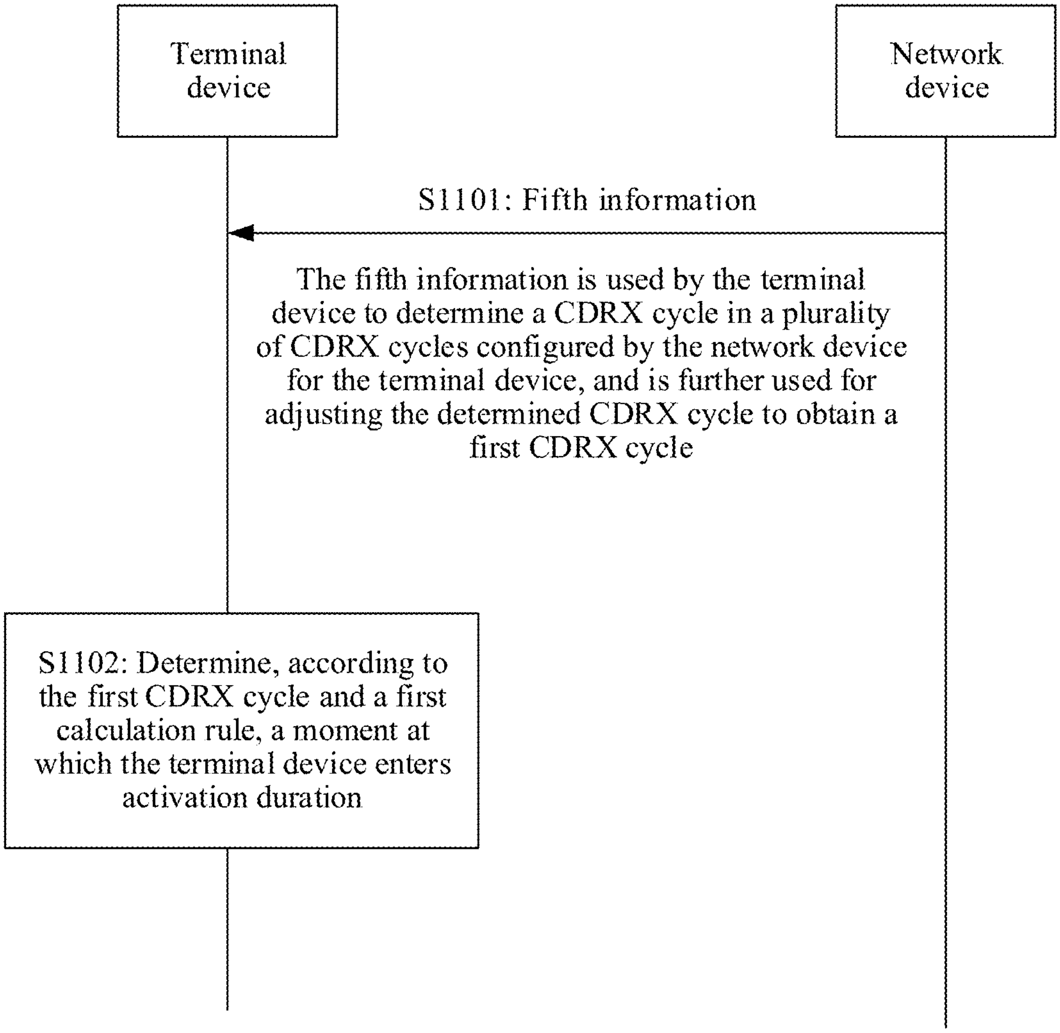
FIG. 11 is a schematic diagram of interaction of a fourth terminal energy saving method according to an embodiment of this application.

Still another terminal energy saving method provided in an embodiment of this application is described below. As shown in FIG. 11, the terminal energy saving method provided in this embodiment of this application includes the following steps S1101 and S1102.

S1101: A network device sends fifth information to a terminal device. Correspondingly, the terminal device receives the fifth information from the network device, where the fifth information is used by the terminal device to determine a CDRX cycle in a plurality of CDRX cycles configured by the network device for the terminal device, and the fifth information is further used by the terminal device to adjust the determined CDRX cycle to obtain a first CDRX cycle.

S1102: The terminal device determines, according to the first CDRX cycle and a first calculation rule, a moment at which the terminal device enters activation duration, where the first CDRX cycle and the first calculation rule are used for controlling the moment at which the terminal device enters the activation duration to match a moment at which the network device sends a downlink frame of a first service according to a service cycle.

In this embodiment of this application, for the specific implementation in which the network device configures a plurality of CDRX cycles for the terminal device, refer to the foregoing description of the third information. Details are not described herein again.

For step S1101, specifically, in this embodiment of this application, the fifth information includes identification information of one CDRX cycle. According to the identification information included in the fifth information, the terminal device may determine, in the plurality of CDRX cycles previously configured, the CDRX cycle corresponding to the identification information.

In this embodiment of this application, the fifth information further includes a cycle adjustment value configured by the network device, and the terminal device adjusts the foregoing determined CDRX cycle according to the received cycle adjustment value. Further, the terminal device may determine the cycle offset value according to the cycle adjustment value included in the first information, and then adjust the foregoing determined CDRX cycle according to the cycle offset value.

Optionally, in this embodiment of this application, the fifth information may be carried in the last data packet included in the downlink frame of the first service. After receiving the fifth information in the activation duration, the terminal device determines, according to the fifth information, a moment of entering the activation duration next time.

Optionally, in this embodiment of this application, if the fifth information is carried in the last data packet included in the downlink frame of the first service, the fifth information may further indicate that the terminal device enters deactivation duration after receiving the downlink frame. In other words, the terminal device enters the deactivation duration after receiving the fifth information.

Optionally, in this embodiment of this application, the fifth information may be carried in a MAC CE message.

For example, the following describes how to carry the fifth information in the MAC CE message in this embodiment of this application.

As shown in FIG. 9, a MAC CE with a data body length of 8 bits is defined. An LCID of the MAC CE indicates that the MAC CE is used to determine one CDRX cycle and adjust the determined CDRX cycle. The value of the first two bits N1N2 in the MAC CE represents identification information of the CDRX cycle. For example, the value of N1N2 being 00 indicates that the identifier of the CDRX cycle is 1, the value of N1N2 being 01 indicates that the identifier of the CDRX cycle is 2, and so on. The value of N1N2 being 11 indicates that the identifier of the CDRX cycle is 4. The last six bits N3 to N8 in the MAC CE have a value of N, and the value of N ranges from 0 to 63. The value of N represents the cycle adjustment value.

After receiving the MAC CE, the terminal device determines, according to the LCID of the MAC CE, that the MAC CE is used to determine a CDRX cycle and adjust the determined CDRX cycle, and then determines, according to the value of N1N2, the value of N, and a preset rule, a CDRX cycle from the configured CDRX cycle pool and a cycle offset value. For example, the network device sends the MAC CE to the terminal device. After receiving the MAC CE, the terminal device determines that the value of N1N2 in the MAC CE is 00, and determines the CDRX cycle with the identifier of 1 in the configured CDRX cycle pool. The terminal device further determines that the value of N in the MAC CE is 61, and the terminal device determines that the cycle offset value is 30 according to the cycle offset value=(N−31). The terminal device then adjusts the CDRX cycle with the identifier of 1 according to the cycle offset value. The positive and negative values of the cycle offset value can also indicate an offset direction of the CDRX cycle. For example, if the cycle offset value is positive, it means that the CDRX cycle is offset backward in time domain; and if the cycle offset value is negative, it means that the CDRX cycle is offset forward in time domain. In this embodiment of this application, the unit of the cycle offset value may be slot, symbol, or ms.

In this embodiment of this application, for how the terminal device adjusts the determined CDRX cycle according to the fifth information to obtain the first CDRX cycle, refer to the foregoing description of the non-memory manner in the Embodiment 2 of this application. Details are not described herein again.

For step S1102, in this embodiment of this application, the first calculation rule satisfies the following relationship:

$$[(\text{SFN}\times 10)+\text{subframe number}]\text{modulo}(\text{drx-Cycle}+\text{cycle-adjust})=\text{drx-StartOffset} \quad \text{formula (10); or}$$

$$[(\text{SFN}\times 10)+\text{subframe number}]\text{modulo}(\text{drx-cycle}+\text{cycle-adjust})=(\text{drx-StartOffset})\text{modulo}(\text{drx-cycle}+\text{cycle-adjust}) \quad \text{formula (11), where}$$

SFN represents a system frame number when the terminal device enters the activation duration; subframe number represents a subframe number in a system frame corresponding to the system frame number when the terminal device enters the activation duration; drx-cycle represents a CDRX cycle determined by the terminal device according to the fifth information from the plurality of configured CDRX cycles; cycle-adjust represents a cycle offset value determined by the terminal device according to the fifth information; (drx-cycle+cycle-adjust) represents the first CDRX cycle (in other words, represents the first CDRX cycle obtained by adjusting the determined CDRX cycle); and drx-StartOffset represents a subframe offset before the terminal device enters the activation duration.

In the foregoing parameters, for the values of drx-StartOffset, SFN, and subframe number, refer to the description of the corresponding parameters in formula (1) or (2) above. Details are not described herein again.

In this embodiment of this application, for how the terminal device determines, according to the first CDRX cycle and formula (10) or formula (11), the moment at which the terminal device enters the activation duration, refer to the foregoing description of Embodiment 2 of this application. Details are not described herein again.

Based on this solution, the network device can send the fifth information, to enable the terminal device to select a CDRX cycle from a plurality of configured CDRX cycles for adjustment. The moment that is determined by the terminal device according to the adjusted CDRX cycle and at which the terminal device enters the activation duration matches the moment at which the network device sends the downlink frame of the first service according to the service cycle, thereby avoiding waste of power consumption of the terminal device and satisfying delay requirements of the first service.

In the foregoing steps S1101 and S1102, the actions of the terminal device may be executed by the processor 501 in the terminal device 50 shown in FIG. 4 by calling the application program code stored in the memory 502 to instruct the terminal device for execution. In the foregoing steps S1101 and S1102, the actions of the network device may be executed by the processor 401 in the network device 40 shown in FIG. 4 by calling the application program code stored in the memory 402 to instruct the network device for execution. This is not limited in this embodiment.

Figure 12:
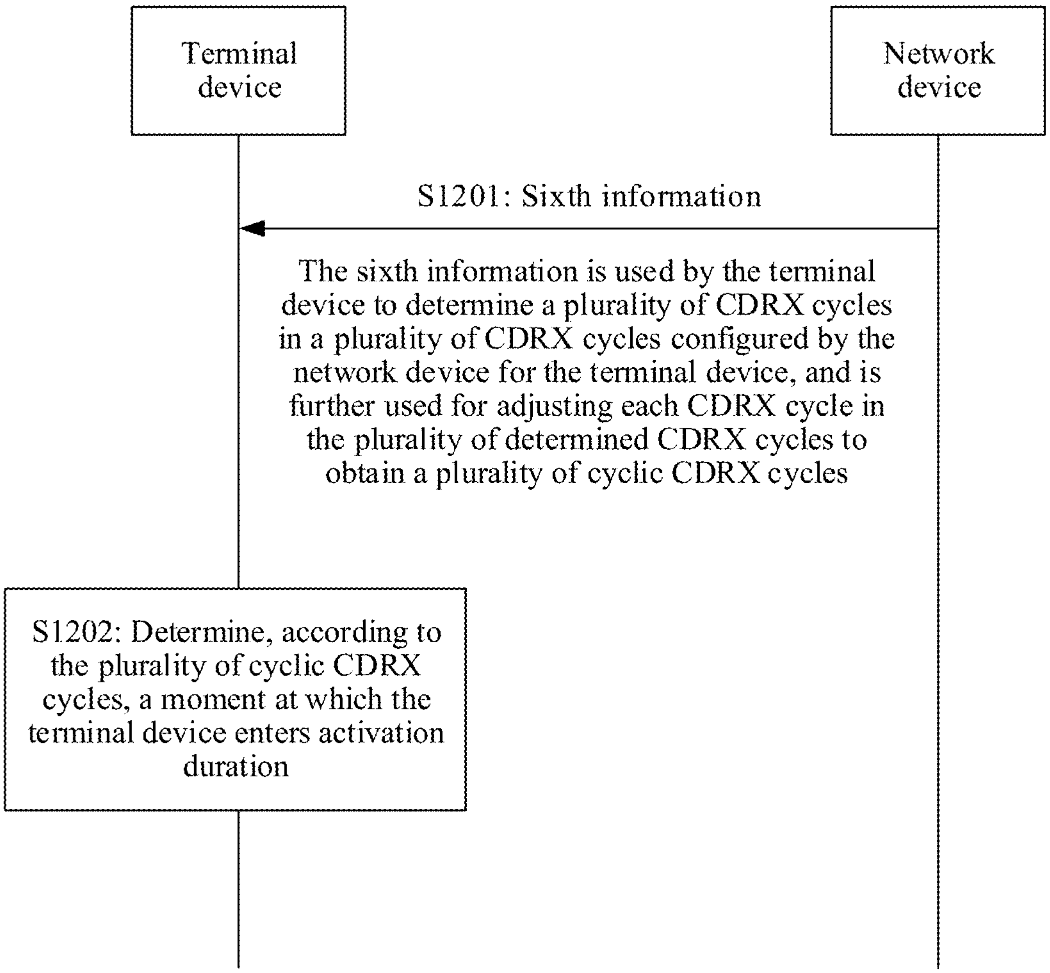
FIG. 12 is a schematic diagram of interaction of a fifth terminal energy saving method according to an embodiment of this application.

Still another terminal energy saving method provided in an embodiment of this application is described below. As shown in FIG. 12, the terminal energy saving method provided in this embodiment of this application includes the following steps S1201 and S1202.

S1201: A network device sends sixth information to a terminal device. Correspondingly, the terminal device receives the sixth information from the network device, where the sixth information is used by the terminal device to determine a plurality of CDRX cycles in a plurality of CDRX cycles configured by the network device for the terminal device, and the sixth information is further used for adjusting each CDRX cycle in the plurality of determined CDRX cycles to obtain a plurality of cyclic CDRX cycles.

S1202: The terminal device determines, according to the plurality of cyclic CDRX cycles, a moment at which the terminal device enters activation duration, where the moment that corresponds to each CDRX cycle in the plurality of cyclic CDRX cycles and at which the terminal device enters the activation duration to match a moment at which the network device sends a downlink frame of a first service according to a service cycle.

In this embodiment of this application, for the specific implementation in which the network device configures a plurality of CDRX cycles for the terminal device, refer to the foregoing description of the third information. Details are not described herein again.

For step S1201, specifically, in this embodiment of this application, the sixth information includes identification information of the plurality of CDRX cycles, and a sequence of the identification information. The terminal device may use, in the configured CDRX cycle pool according to the identification information of the CDRX cycles included in the sixth information, the CDRX cycles corresponding to the identification information as the CDRX cycles in the plurality of CDRX cycles that need to be adjusted.

In this embodiment of this application, the sixth information further includes a cycle adjustment value corresponding to the identification information. After receiving the sixth information, the terminal device adjusts the corresponding CDRX cycle in the plurality of CDRX cycles determined according to the identification information according to the cycle adjustment value. Further, the terminal device may determine the cycle offset value according to the cycle adjustment value included in the sixth information, and then adjust the corresponding CDRX cycle in the plurality of CDRX cycles determined according to the identification information according to the cycle offset value. After adjusting each CDRX cycle in the plurality of CDRX cycles determined according to the identification information, the terminal device obtains a plurality of cyclic CDRX cycles, and then determines, according to a sequence of the identification information, a cyclic sequence of the corresponding plurality of cyclic CDRX cycles.

Optionally, in this embodiment of this application, the sixth information may be carried in the last data packet included in the downlink frame of the first service. After receiving the sixth information in the activation duration, the terminal device determines, according to the sixth information, a moment of entering the activation duration next time.

Optionally, in this embodiment of this application, if the sixth information is carried in the last data packet included in the downlink frame of the first service, the sixth information may further indicate that the terminal device enters deactivation duration after receiving the downlink frame. In other words, the terminal device enters the deactivation duration after receiving the sixth information.

Optionally, in this embodiment of this application, the sixth information may be carried in a MAC CE message.

For example, the following describes how to carry the sixth information in the MAC CE message in this embodiment of this application.

Figure 13:
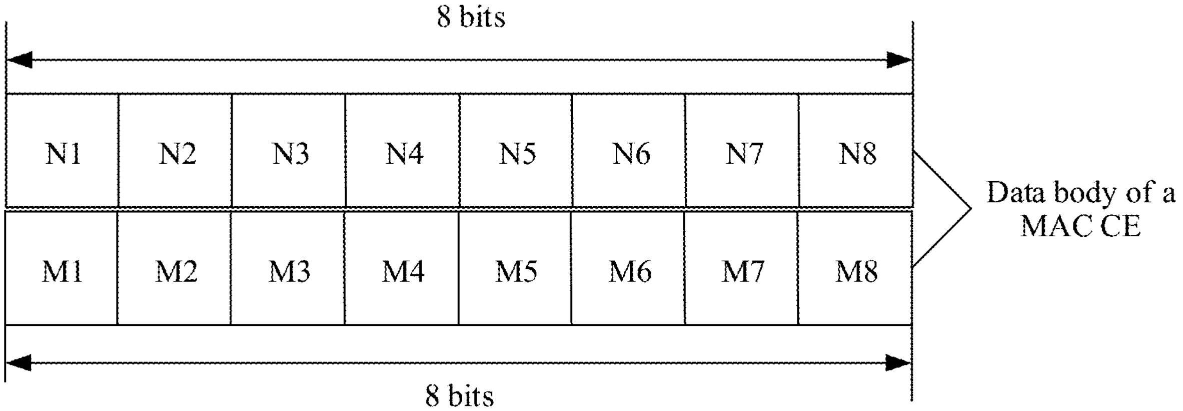
FIG. 13 is a schematic diagram of still another MAC CE according to an embodiment of this application.

As shown in FIG. 13, a MAC CE with a data body length of two bytes (8 bits per byte) is defined. An LCID of the MAC CE indicates that the MAC CE is used to determine a plurality of CDRX cycles and adjust the plurality of determined CDRX cycles to obtain a plurality of cyclic CDRX cycles. 8 bits included in the previous byte of the MAC CE are N1 to N8, and 8 bits included in the next byte are M1 to M8. From N1 to N8, the value of N1N2 represents identification information of a CDRX cycle. For example, the value of N1N2 being 00 indicates that the identifier of the CDRX cycle is 1, the value of N1N2 being 01 indicates that the identifier of the CDRX cycle is 2, and so on. The value of N1N2 being 11 indicates that the identifier of the CDRX cycle is 4. N3 to N8 have a value of N, and the value of N ranges from 0 to 63. N is a cycle adjustment value corresponding to identification information represented by N1N2. From M1 to M8, the value of M1M2 represents identification information of a CDRX cycle. For example, the value of M1M2 being 00 indicates that the identifier of the CDRX cycle is 1, and so on. The value of M1M2 being 11 indicates that the identifier of the CDRX cycle is 4. M3 to M8 have a value of M, and the value of M ranges from 0 to 63. M is a cycle adjustment value corresponding to identification information represented by M1M2.

After receiving the MAC CE, the terminal device determines, according to the LCID of the MAC CE, that the MAC CE is used to determine a plurality of CDRX cycles and adjust the plurality of determined CDRX cycles to obtain a plurality of cyclic CDRX cycles, and then determines, according to the value of N1N2, the value of M1M2, the values of N and M, and a preset rule, a plurality of CDRX cycles from the configured CDRX cycle pool and a corresponding cycle offset value. For example, N1N2 is 00, the terminal device determines a CDRX cycle with an identifier of 1 from the configured CDRX cycle pool, the value of N is 61, and the terminal device determines, according to the cycle offset value=(N−31), that a cycle offset value corresponding to the CDRX cycle with the identifier of 1 is 30. M1M2 is 01, the terminal device determines a CDRX cycle with an identifier of 2 from the configured CDRX cycle pool, the value of M is 41, and the terminal device determines, according to the cycle offset value=(M−31), that a cycle offset value corresponding to the CDRX cycle with the identifier of 2 is 10. The terminal device then adjusts the CDRX cycles with the identifier of 1 and the identifier of 2 respectively according to the corresponding cycle offset values. The positive and negative values of the cycle offset value can also indicate an offset direction of the CDRX cycle. For example, if the cycle offset value is positive, it means that the CDRX cycle is offset backward in time domain; and if the cycle offset value is negative, it means that the CDRX cycle is offset forward in time domain. In this embodiment of this application, the unit of the cycle offset value may be slot, symbol, or ms.

After adjusting the CDRX cycle indicated by N1N2 and the CDRX cycle indicated by M1M2, the terminal device obtains a plurality of cyclic CDRX cycles, and determines, according to a sequence of N1N2 and M1M2, a cyclic sequence of the corresponding plurality of CDRX cycles.

In this embodiment of this application, for how the terminal device adjusts each CDRX cycle in the plurality of determined CDRX cycles according to the sixth information to obtain the plurality of cyclic CDRX cycles, refer to the foregoing description of the non-memory manner in the Embodiment 2 of this application. Details are not described herein again.

For step S1202, in this embodiment of this application, for how the terminal device determines, according to the plurality of cyclic CDRX cycles, the moment at which the terminal device enters the activation duration, refer to the foregoing description of Embodiment 3. Details are not described herein again.

Based on this solution, the network device can send the sixth information, to enable the terminal device to select a plurality of CDRX cycles from a plurality of configured CDRX cycles for adjustment and determine the plurality of adjusted CDRX cycles as a plurality of cyclic CDRX cycles. The moment that is determined by the terminal device according to the plurality of cyclic CDRX cycles and at which the terminal device enters the activation duration matches the moment at which the network device sends the downlink frame of the first service according to the service cycle, thereby avoiding waste of power consumption of the terminal device and satisfying delay requirements of the first service.

In the foregoing steps S1201 and S1202, the actions of the terminal device may be executed by the processor 501 in the terminal device 50 shown in FIG. 4 by calling the application program code stored in the memory 502 to instruct the terminal device for execution. In the foregoing steps S1201 and S1202, the actions of the network device may be executed by the processor 401 in the network device 40 shown in FIG. 4 by calling the application program code stored in the memory 402 to instruct the network device for execution. This is not limited in this embodiment.

It may be understood that, in the foregoing embodiments, methods and/or steps implemented by the terminal device may also be implemented by a component (for example, a chip or a circuit) that can be used in the terminal device, and methods and/or steps implemented by the network device may also be implemented by a component (for example, a chip or a circuit) that can be used in the network device.

The foregoing mainly describes, from a perspective of interaction between various devices, the solutions provided in embodiments of this application. Correspondingly, an embodiment of this application further provides a communication apparatus, and the communication apparatus is configured to implement the foregoing various methods. The communication apparatus may be the terminal device in the foregoing method embodiments, an apparatus including the foregoing terminal device, or a component that can be used in the terminal device. Alternatively, the communication apparatus may be the network device in the foregoing method embodiments, an apparatus including the foregoing network device, or a component that can be used in the network device. It may be understood that, to implement the foregoing functions, the communication apparatus includes a corresponding hardware structure and/or software module for performing the functions. A person skilled in the art should be easily aware that units, algorithms, and steps in the examples described with reference to embodiments disclosed in this specification can be implemented in a form of hardware or a combination of hardware and computer software in this application. Whether a function is performed by hardware or hardware driven by computer software depends on particular applications and design constraints of the technical solutions. A person skilled in the art may use different methods to implement the described functions for each specific application, but it should not be considered that the implementation goes beyond the scope of this application.

In embodiments of this application, the communication apparatus may be divided into functional modules based on the foregoing method embodiments. For example, division into the functional modules may be based on corresponding functions, or two or more functions may be integrated into one processing module. The integrated module may be implemented in a form of hardware, or may be implemented in a form of a software functional module. It should be noted that, in embodiments of this application, module division is an example, and is merely a logical function division. In actual implementation, another division manner may be used.

Figure 14:
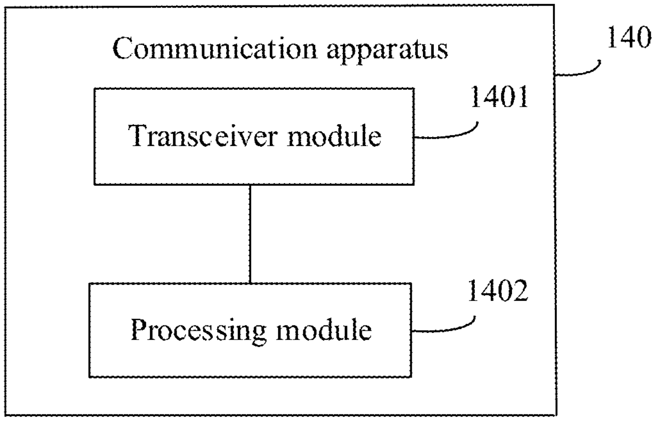
FIG. 14 is a schematic diagram of a structure of a communication apparatus according to an embodiment of this application.

FIG. 14 is a schematic diagram of a structure of a communication apparatus 140. The communication apparatus 140 includes a transceiver module 1401 and a processing module 1402. The transceiver module 1401 may also be referred to as a transceiver unit for implementing transmission and reception functions. For example, the transceiver module may be a transceiver circuit, a transceiver machine, a transceiver, or a communication interface.

For example, the communication apparatus 140 is the terminal device in the foregoing method embodiments.

In a possible implementation, the transceiver module 1401 is configured to receive first information from a network device, where the first information is used for determining a first CDRX cycle corresponding to the communication apparatus. The processing module 1402 is configured to determine, according to the first CDRX cycle and a first calculation rule, a moment at which the communication apparatus enters activation duration, where the first calculation rule is used for controlling the moment at which the communication apparatus enters the activation duration to match a moment at which the network device sends a downlink frame of a first service according to a service cycle.

Optionally, the first CDRX cycle corresponding to the communication apparatus is a first CDRX cycle configured by the network device for the communication apparatus, and the first CDRX cycle is the same as the service cycle.

Optionally, the first calculation rule satisfies the following relationship: $\lfloor[(SFN\times10)+\text{subframe number}]\text{ modulo }(\text{drx-cycle})\rfloor=\text{drx-StartOffset}$; or $\lfloor[(SFN\times10)+\text{subframe number}]\text{ modulo }(\text{drx-cycle})\rfloor=(\text{drx-StartOffset})\text{ modulo }(\text{drx-cycle})$, where SFN represents a system frame number when the communication apparatus enters the activation duration; subframe number represents a subframe number in a system frame corresponding to the system frame number; drx-cycle represents the first CDRX cycle; and drx-StartOffset represents a subframe offset before the communication apparatus enters the activation duration.

Optionally, the first information includes the service cycle of the first service; or the first information includes a value of the first CDRX cycle; or the first information includes a frequency of the first CDRX cycle; or the first information includes a preset integer value, and the preset integer value is used by the communication apparatus to determine the first CDRX cycle according to a preset relationship.

Optionally, the first information is carried in a radio resource control RRC message.

Optionally, the first CDRX cycle corresponding to the communication apparatus is a first CDRX cycle obtained by adjusting, according to the first information, a CDRX cycle configured for the communication apparatus.

Optionally, the first calculation rule satisfies the following relationship: [(SFN×10)+subframe number] modulo (drx-Cycle+cycle-adjust)=drx-StartOffset; or [(SFN×10)+subframe number] modulo (drx-cycle+cycle-adjust)=(drx-StartOffset) modulo (drx-cycle+cycle-adjust), where SFN represents a frame number when the communication apparatus enters the activation duration; subframe number represents a subframe number in a system frame corresponding to the system frame number; drx-cycle represents a CDRX cycle configured by the network device for the communication apparatus; cycle-adjust represents a cycle offset value determined by the communication apparatus according to the first information; (drx-cycle+cycle-adjust) represents the first CDRX cycle corresponding to the communication apparatus; and drx-StartOffset represents a subframe offset before the communication apparatus enters the activation duration.

Optionally, the first calculation rule satisfies the following relationship: [(SFN×10)+subframe number] modulo (drx-cycleN)=drx-StartOffset; or [(SFN×10)+subframe number] modulo (drx-cycleN)=(drx-StartOffset) modulo (drx-cycleN), where SFN represents a frame number when the communication apparatus enters the activation duration; subframe number represents a subframe number in a system frame corresponding to the system frame number; drx-cycleN represents the first CDRX cycle corresponding to the communication apparatus; and drx-StartOffset represents a subframe offset before the communication apparatus enters the activation duration, where drx-cycleN satisfies the following relationship: drx-cycleN=drx-cycle (N−1)+cycle-adjust, where drx-cycle (N−1) represents a CDRX cycle configured before the communication apparatus enters the activation duration; when drx-cycle (N−1)=drx-cycle0, drx-cycle0 represents a CDRX cycle configured by the network device for the communication apparatus; and cycle-adjust represents a cycle offset value determined by the communication apparatus according to the first information.

Optionally, the first information is carried in a media access control control element MAC CE message.

In another possible implementation, the transceiver module 1401 is configured to receive second information from a network device, where the second information is used for determining one or more CDRX cycles in a plurality of CDRX cycles configured by the network device for the communication apparatus, and the one or more CDRX cycles are used for controlling a moment at which the communication apparatus enters activation duration to match a moment at which the network device sends a downlink frame of a first service according to a service cycle. The processing module 1402 is configured to determine, according to the one or more CDRX cycles, the moment at which the communication apparatus enters the activation duration.

Optionally, the one or more CDRX cycles are a plurality of cyclic CDRX cycles; and the plurality of cyclic CDRX cycles are used for controlling the moment at which the communication apparatus corresponding to each CDRX cycle in the plurality of cyclic CDRX cycles enters the activation duration to match the moment at which the network device sends the downlink frame of the first service according to the service cycle.

Optionally, the second information includes identification information corresponding to each CDRX cycle in the plurality of cyclic CDRX cycles, and a sequence of the identification information, where the sequence of the identification information corresponds to a cyclic sequence of the plurality of cyclic CDRX cycles.

Optionally, the second information is carried in a radio resource control RRC message; or the second information is carried in a media access control control element MAC CE message.

Optionally, the one or more CDRX cycles are first CDRX cycles; and the first CDRX cycles are used for controlling the moment at which the communication apparatus enters the activation duration to match the moment at which the network device sends the downlink frame of the first service according to the service cycle.

Optionally, the second information includes identification information corresponding to the first CDRX cycle.

Optionally, the second information is carried in an RRC message; or the second information is carried in a MAC CE message.

Optionally, the transceiver module 1401 is further configured to receive third information from the network device, where the third information is used by the network device to configure the plurality of CDRX cycles for the communication apparatus, and the plurality of CDRX cycles include the one or more CDRX cycles.

Optionally, the third information includes identification information corresponding to each CDRX cycle in the plurality of CDRX cycles, and configuration information of the CDRX cycle corresponding to the identification information.

Optionally, the third information is carried in an RRC message.

In still another possible implementation, the transceiver module 1401 is configured to receive fourth information from the network device, where the fourth information indicates a moment at which the communication apparatus enters activation duration next time after receiving a first downlink frame of a first service; the moment at which the communication apparatus enters the activation duration next time matches a moment at which the network device sends a second downlink frame of the first service; and the second downlink frame is a first downlink frame sent by the network device according to a service cycle after the first downlink frame. The processing module 1402 is configured to determine, according to the fourth information, the moment at which the communication apparatus enters the activation duration next time after receiving the first downlink frame.

Optionally, the fourth information is carried in a last data packet included in the first downlink frame.

Optionally, the fourth information further indicates that the communication apparatus enters deactivation duration after receiving the first downlink frame.

Optionally, the fourth information is carried in a media access control control element MAC CE message.

All related content of the steps in the method embodiments may be cited in function descriptions of corresponding functional modules. Details are not described herein again.

In this embodiment, the communication apparatus 140 is presented with the function modules implemented through integration. The "module" herein may be a specific ASIC, a circuit, a processor and a memory that execute one or more software or firmware programs, an integrated logic circuit, and/or another component that can provide the foregoing functions.

In a simple embodiment, a person skilled in the art may figure out that the communication apparatus 140 may use the form of the terminal device 50 shown in FIG. 4.

For example, the processor 501 in the terminal device 50 shown in FIG. 4 may call the computer executable instructions stored in the memory 502, so that the terminal device

50 performs the terminal energy saving method in the foregoing method embodiments. Specifically, functions/implementation processes of the transceiver module 1401 and the processing module 1402 in FIG. 14 may be implemented by the processor 501 in the terminal device 50 shown in FIG. 4 by invoking the computer executable instructions stored in the memory 502. Alternatively, a function/implementation process of the processing module 1402 in FIG. 14 may be implemented by the processor 501 in the terminal device 50 shown in FIG. 4 by calling the computer executable instructions stored in the memory 502, and a function/implementation process of the transceiver module 1401 in FIG. 14 may be implemented by the transceiver 503 in the terminal device 50 shown in FIG. 4. The communication apparatus 140 provided in this embodiment may perform the foregoing terminal energy saving method. Therefore, for technical effects that can be achieved by the communication apparatus, refer to the foregoing method embodiments. Details are not described herein again.

Figure 15:
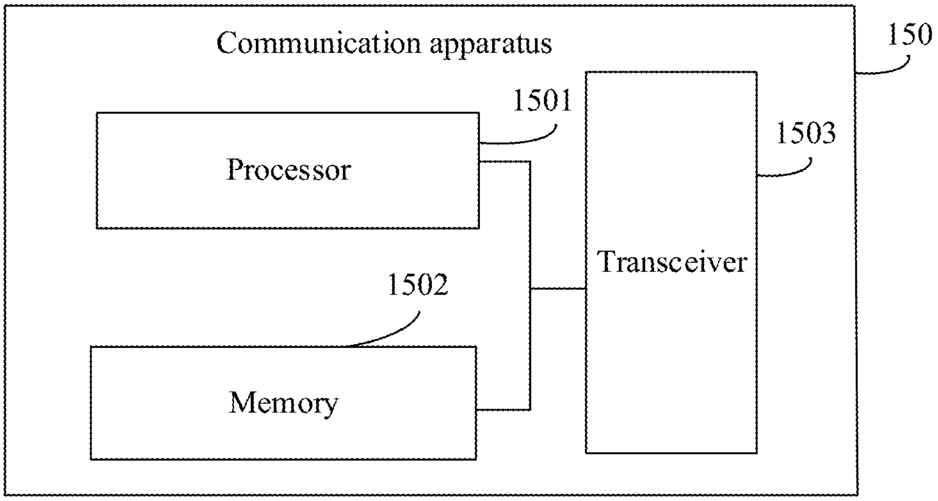
FIG. 15 is a schematic diagram of a structure of another communication apparatus according to an embodiment of this application.

FIG. 15 is a schematic diagram of a structure of another communication apparatus 150. As shown in FIG. 15, the communication apparatus 150 includes a processor 1501, a memory 1502, and a transceiver 1503. The memory 1503 is configured to store computer executable instructions, the processor 1501 is configured to execute the instructions stored in the memory 1503, and the transceiver 1503 is configured to communicate with other devices in a communication network. The communication apparatus 150 may be the terminal device in the foregoing method embodiments.

In a simple embodiment, a person skilled in the art may figure out that the communication apparatus 140 may use the form of the communication apparatus 150 shown in FIG. 15. For example, a function/implementation process of the processing module 1402 in FIG. 14 may be implemented by the processor 1501 in the communication apparatus 150 shown in FIG. 15 by calling the computer executable instructions stored in the memory 1502, and a function/implementation process of the transceiver module 1401 in FIG. 14 may be implemented by the transceiver 1503 in the communication apparatus 150 shown in FIG. 15. The communication apparatus 150 provided in this embodiment may perform the foregoing terminal energy saving method. Therefore, for technical effects that can be achieved by the communication apparatus, refer to the foregoing method embodiments. Details are not described herein again.

It should be noted that one or more of the foregoing modules or units may be implemented by using software, hardware, or a combination thereof. When any one of the foregoing modules or units is implemented by using software, the software exists in a form of computer program instructions, and is stored in a memory. A processor may be configured to execute the program instructions to implement the foregoing method procedures. The processor may be built into a SoC (system-on-a-chip) or an ASIC, or may be an independent semiconductor chip. The processor includes a core for executing software instructions to perform operations or processing, and may further include a necessary hardware accelerator, for example, a field programmable gate array (field programmable gate array, FPGA), a PLD (programmable logic device), or a logic circuit that implements a special-purpose logic operation.

When the foregoing modules or units are implemented by using hardware, the hardware may be any one or any combination of a CPU, a microprocessor, a digital signal processing (digital signal processing, DSP) chip, a microcontroller unit (microcontroller unit, MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedures.

Optionally, an embodiment of this application further provides a chip system, including at least one processor and an interface, where the at least one processor is coupled to a memory through the interface, and when the at least one processor executes a computer program or an instruction in the memory, the method according to any one of the foregoing method embodiments is enabled to be executed. In a possible implementation, the communication apparatus further includes a memory. Optionally, the chip system may include a chip, or may include a chip and another discrete device. This is not specifically limited in this embodiment of this application.

All or some of the foregoing embodiments may be implemented by software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the processes or functions according to embodiments of this application are produced. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to embodiments, in a process of implementing this application that claims protection, a person skilled in the art may understand and implement another variation of the disclosed embodiments by viewing the appended drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are set forth in dependent claims that are different from each other, but this does not mean that these measures cannot be combined to produce a great effect.

Although this application is described with reference to specific features and all embodiments thereof, it is clear that various modifications and combinations may be made to them without departing from the spirit and scope of this application. Correspondingly, this specification and the accompanying drawings are merely example description of this application defined by the appended claims, and are considered as any or all of modifications, variations, combinations or equivalents that cover the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A terminal energy saving method, wherein the method comprises:

receiving first information from a network device, wherein the first information is used for determining CDRX control information associated with a service cycle of a first service corresponding to a terminal device; and determining, according to the CDRX control information, a moment at which the terminal device enters activation duration, wherein the CDRX control information is used to control the moment at which the terminal device enters the activation duration such that activation timing cross successive activation durations is not determined from a single fixed CDRX periodicity, wherein the CDRX control information comprises a plurality of identification information indicating a plurality of CDRX cycles, each of which corresponding to a CDRX cycle of the plurality of CDRX cycles in a configured CDRX cycle pool and a sequence of the plurality of identification information corresponding to a cyclic sequence of one or more CDRX cycles, selected from the configured CDRX cycle pool, and the moment is determined per cycle according to the one or more CDRX cycles; and wherein the moment at which the terminal device enters an activation duration matches a moment at which the network device sends a downlink frame of a first service according to the service cycle.

2. The method according to claim 1, wherein the CDRX control information indicates a CDRX cycle is configured by the network device for the terminal device, and the CDRX cycle is the same as the service cycle, and the terminal device determines the moment by applying a calculation rule based on the CDRX cycle.

3. The method according to claim 2, wherein the calculation rule satisfies the following relationship:

$$\lfloor[(\mathrm{SFN}\times 10)+\text{subframe number}]\,\mathrm{modulo}(\text{drx-cycle})\rfloor=\text{drx-StartOffset}; \text{ or}$$

$$\lfloor[(\mathrm{SFN}\times 10)+\text{subframe number}]\,\mathrm{modulo}(\text{drx-cycle})\rfloor=(\text{drx-StartOffset})\,\mathrm{modulo}(\text{drx-cycle}), \text{ wherein}$$

SFN represents a system frame number when the terminal device enters the activation duration; subframe number represents a subframe number in a system frame corresponding to the system frame number; drx-cycle represents the CDRX cycle indicated by the CDRX control information; and drx-StartOffset represents a subframe offset before the terminal device enters the activation duration.

4. The method according to claim 2, wherein the first information comprises the service cycle of the first service; or the first information comprises a value of the CDRX cycle indicated by the CDRX control information; or the first information comprises a frequency of the CDRX cycle indicated by the CDRX control information; or the first information comprises a preset integer value, and the preset integer value is used by the terminal device to determine the CDRX control information according to a preset relationship.

5. The method according to claim 2, wherein the first information is carried in a radio resource control RRC message.

6. The method according to claim 2, wherein the CDRX control information is used to determine a CDRX cycle obtained by adjusting, according to the first information, a CDRX cycle configured for the terminal device.

7. The method according to claim 6, wherein the calculation rule satisfies the following relationship:

$$[(\mathrm{SFN}\times 10)+\text{subframe number}]\,\mathrm{modulo}(\text{drx-Cycle}+\text{cycle-adjust})=\text{drx-StartOffset}; \text{ or}$$

$$[(\mathrm{SFN}\times 10)+\text{subframe number}]\,\mathrm{modulo}(\text{drx-cycle}+\text{cycle-adjust})=(\text{drx-StartOffset})\,\mathrm{modulo}(\text{drx-cycle}+\text{cycle-adjust}), \text{ wherein}$$

SFN represents a system frame number when the terminal device enters the activation duration; subframe number represents a subframe number in a system frame corresponding to the system frame number; drx-cycle represents a CDRX cycle configured by the network device for the terminal device; cycle-adjust represents a cycle offset value determined by the terminal device according to the first information; (drx-cycle+cycle-adjust) represents the CDRX cycle determined based on the first information for at least one activation duration; and drx-StartOffset represents a subframe offset before the terminal device enters the activation duration.

8. The method according to claim 6, wherein the calculation rule satisfies the following relationship:

$$[(\mathrm{SFN}\times 10)+\text{subframe number}]\,\mathrm{modulo}(\text{drx-cycleN})=\text{drx-StartOffset}; \text{ or}$$

$$[(\mathrm{SFN}\times 10)+\text{subframe number}]\,\mathrm{modulo}(\text{drx-cycleN})=(\text{drx-StartOffset})\,\mathrm{modulo}(\text{drx-cycleN}), \text{ wherein}$$

SFN represents a system frame number when the terminal device enters the activation duration; subframe number represents a subframe number in a system frame corresponding to the system frame number; drx-cycleN represent, for an Nth activation duration, a CDRX cycle determined based on the first information; and drx-StartOffset represents a subframe offset before the terminal device enters the activation duration, wherein drx-cycleN satisfies the following relationship: drx-cycleN=drx-cycle (N−1)+cycle-adjust, wherein drx-cycle (N−1) represents a CDRX cycle configured before the terminal device enters the activation duration; when drx-cycle (N−1)=drx-cycle0, drx-cycle0 represents a CDRX cycle configured by the network device for the terminal device; and cycle-adjust represents a cycle offset value determined by the terminal device according to the first information.

9. The method according to claim 6, wherein the first information is carried in a media access control (MAC) control element (CE) message.

10. A terminal device energy saving method, wherein the method comprises:

receiving third information from a network device, wherein the third information configures a plurality of CDRX cycles for the terminal device as a configured CDRX cycle pool, and wherein the third information comprises a plurality of identification information each of which corresponding to each CDRX cycle in the plurality of CDRX cycles and configuration information of the CDRX cycle corresponding to the plurality of identification information;

receiving a second information from a network device, wherein the second information comprises a plurality of identification information each corresponding to each CDRX cycle in the plurality of CDRX cycles and a sequence of the plurality of identification information, and the sequence of the identification information corresponds to a cyclic sequence of the plurality of CDRX cycles; and determining, according to the plurality of CDRX cycles selected based on the sequence of the plurality of identification information, a moment at which the terminal device enters activation duration to match a moment at which the network device sends a downlink frame of a first service according to a service cycle.

11. The method according to claim 10, wherein the plurality of cyclic CDRX cycles are used for controlling the moment that corresponds to each CDRX cycle in the plurality of cyclic CDRX cycles and at which the terminal device enters the activation duration to match the moment at which the terminal device enters the activation duration to match the moment at which the network device sends the downlink frame of the first service according to the service cycle.

12. The method according to claim 11, wherein the second information is carried in a radio resource control RRC message; or the second information is carried in a media access control (MAC) control element (CE) message.

13. The method according to claim 10, wherein the plurality of CDRX cycles are first CDRX cycles; and the first CDRX cycles are used for controlling the moment at which the terminal device enters the activation duration to match the moment at which the network device sends the downlink frame of the first service according to the service cycle.

14. The method according to claim 13, wherein the second information comprises identification information corresponding to a first CDRX cycle in the configured CDRX cycle pool.

15. The method according to claim 13, wherein the second information is carried in an RRC message; or the second information is carried in a MAC CE message.

16. The method according to claim 10, wherein the configuration information comprises a value of a CDRX cycle corresponding to the identification information.

17. The method according to claim 10, wherein the third information is carried in an RRC message.

18. A communication apparatus, comprising: a processor, a memory, and a transceiver, wherein the memory is configured to store computer executable instructions; the processor is configured to execute the instructions stored in the memory; the transceiver is configured to communicate with a network device; and when the communication apparatus runs, the processor executes the instructions to cause the communication apparatus to receive, via the transceiver, first information from the network device, wherein the first information is used for determining CDRX control information associated with a service cycle of a first service corresponding to a terminal device; and determine, according to the CDRX control information, a moment at which the terminal device enters activation duration, wherein the CDRX control information is used to control the moment at which the communication apparatus enters the activation duration such that activation timing cross successive activation durations is not determined from a single fixed CDRX periodicity, wherein the CDRX control information comprises a plurality of information indicating a plurality of CDRX cycles, each of which corresponds to a CDRX cycle of the plurality of CDRX cycles in a configured CDRX cycle pool and a sequence of the plurality of identification information corresponding to a cyclic sequence of one or more CDRX cycles, selected from the configured CDRX cycle pool, and the moment is determined per cycle according to the one or more CDRX cycles; and wherein the moment at which the terminal device enters an activation duration matches a moment at which the network device sends a downlink frame of a first service according to the service cycle.

19. The method according to claim 18, wherein the CDRX control information is used to determine a CDRX cycle obtained by adjusting, according to the first information, a CDRX cycle configured for the terminal device, and the CDRX control information is used to control the moment by applying a calculation rule based on the CDRX cycle.

20. The method according to claim 19, wherein the calculation rule satisfies the following relationship:

[(SFN×10)+subframe number]modulo(drx-Cycle+cycle-adjust)=drx-StartOffset; or

[(SFN×10)+subframe number]modulo(drx-cycle+cycle-adjust)=(drx-StartOffset)modulo(drx-cycle+cycle-adjust), wherein SFN represents a system frame number when the terminal device enters the activation duration; subframe number represents a subframe number in a system frame corresponding to the system frame number; drx-cycle represents a CDRX cycle configured by the network device for the terminal device; cycle-adjust represents a cycle offset value determined by the terminal device according to the first information; (drx-cycle+cycle-adjust) represents the CDRX cycle determined based on the first information for at least one activation duration; and drx-StartOffset represents a subframe offset before the terminal device enters the activation duration, or wherein the calculation rule satisfies the following relationship:

[(SFN×10)+subframe number]modulo(drx-cycleN)=drx-StartOffset; or

[(SFN×10)+subframe number]modulo(drx-cycleN)=(drx-StartOffset)modulo(drx-cycleN), wherein SFN represents a system frame number when the terminal device enters the activation duration; subframe number represents a subframe number in a system frame corresponding to the system frame number; drx-cycleN represent, for an Nth activation duration, a CDRX cycle determined based on the first information; and drx-StartOffset represents a subframe offset before the terminal device enters the activation duration, wherein drx-cycleN satisfies the following relationship: drx-cycleN=drx-cycle (N−1)+cycle-adjust, wherein drx-cycle (N−1) represents a CDRX cycle configured before the terminal device enters the activation duration; when drx-cycle (N−1)=drx-cycle0, drx-cycle0 represents a CDRX cycle configured by the network device for the terminal device; and cycle-adjust represents a cycle offset value determined by the terminal device according to the first information.

* * * * *